Feb. 9, 1960 W. A. MALTHANER 2,924,665

ELECTRICAL SCANNING CIRCUITS

Filed Aug. 5, 1957 8 Sheets-Sheet 1

INVENTOR
W. A. MALTHANER
BY Kenneth B Hamlin
ATTORNEY

Feb. 9, 1960 W. A. MALTHANER 2,924,665

ELECTRICAL SCANNING CIRCUITS

Filed Aug. 5, 1957 8 Sheets-Sheet 2

INVENTOR
W. A. MALTHANER
BY Kenneth B. Hamlin
ATTORNEY

Feb. 9, 1960 W. A. MALTHANER 2,924,665

ELECTRICAL SCANNING CIRCUITS

Filed Aug. 5, 1957 8 Sheets-Sheet 3

INVENTOR
W. A. MALTHANER
BY Kenneth B. Hamlin
ATTORNEY

INVENTOR
W. A. MALTHANER
BY Kenneth B. Hamlin
ATTORNEY

ELECTRICAL SCANNING CIRCUITS

INVENTOR
W. A. MALTHANER
BY Kenneth B Hamlin
ATTORNEY

INVENTOR
W. A. MALTHANER
BY Kenneth B. Hamlin
ATTORNEY

INVENTOR
W. A. MALTHANER
BY Kenneth B. Hamlin
ATTORNEY

Feb. 9, 1960 W. A. MALTHANER 2,924,665

ELECTRICAL SCANNING CIRCUITS

Filed Aug. 5, 1957 8 Sheets-Sheet 8

INVENTOR
W. A. MALTHANER
BY Kenneth B. Hamlin
ATTORNEY

United States Patent Office 2,924,665

Patented Feb. 9, 1960

2,924,665

ELECTRICAL SCANNING CIRCUITS

William A. Malthaner, New Providence, N.J., assignor to Bell Telephone Laboratories, Incorporated, New York, N.Y., a corporation of New York Application August 5, 1957, Serial No. 676,173

25 Claims. (Cl. 179—18)

This invention relates to automatic common control telephone systems and more particularly to means in such systems for periodically scanning subscriber lines associated therewith.

In many electrical information handling systems, such as those constituting automatic telephone systems, information to be considered by the system and upon which subsequent operations of the system depend, may originate at any of a plurality of possible sources. The information made available to the system may be introduced in the form of various electrical manifestations such as, for example, a current pulse of a particular polarity or, as is the case in an automatic telephone system, the well-known open or closed condition of a subscriber line loop circuit. Information thus introduced into such a system may be temporarily or permanently stored in storage means provided therefor where it may be advantageously accessible to control and determine subsequent operations of the system. In an automatic telephone system, for example, information introduced could be available as indicative of a request for service by a calling subscriber. In this connection it is readily apparent that if the information introduced from a plurality of possible sources is to have any meaning, it is necessary to positively determine not only the character of this information but also the particular one of the plurality of sources at which the information originates. Thus, for obvious reasons, must be determined the particular subscriber originating a call for service in a telephone system. Further, it is imperative that, when information is available for introduction at any of the sources, appropriate agencies within the system be instantly apprised of this fact.

The determination of the fact that information seeks admission to the system, the identification of the point of origin of the information as well as the reading of the character of the information introduced, are accordingly functions to be necessarily accomplished by an information handling system such as an automatic telephone system having the advantage of common control. As is well-known, in such a telephone system, information introduced by way of the subscriber line circuits is stored temporarily by centralized control equipment before being used as a basis for controlling the switching operations. One such telephone system is described in detail in my and H. E. Vaughan's Patent 2,723,311, issued November 8, 1955. Since the present invention concerns itself chiefly with the first two of the functions referred to hereinbefore and only broadly with the reading of the information introduced, only so much of a telephone system with which the use of the present invention is contemplated will be described herein as is dictated by a full disclosure of this invention.

To determine the fact and origin of the information introduced, subscriber line scanning arrangements are also well-known and have taken a number of forms. In this connection reference may be had to the descriptions of such arrangements in the patents of F. T. Andrews, Jr., Nos. 2,715,656 and 2,715,657 both of August 16, 1955, and to the copending application of G. F. Abbott and A. E. Joel, Serial No. 555,947, filed December 28, 1955, now Patent No. 2,853,555 issued September 23, 1958. While subscriber line scanning arrangements heretofore advanced for use in high speed common control telephone systems have been satisfactory, few have met all of the requirements imposed on such arrangements in terms of manufacturability, reliability, economy, and the ability to operate within prescribed marginal limitations.

The advent of magnetic cores exhibiting a substantially rectangular hysteresis characteristic presently offers a new direction for the realization of a new, universally satisfactory line scanning arrangement. It is, accordingly, an object of this invention to accomplish the scanning of subscriber lines in a high speed common control telephone system in a new and improved manner having advantages generally in terms of performance and economy not heretofore known.

Another object of this invention is the periodic scanning of a plurality of information inputs in an electrical information processing system in a new and improved manner to determine the fact of the introduction of the information and the identification of the input.

Still another object of this invention is to utilize the versatility and high degree of dependability of magnetic cores displaying substantially rectangular hysteresis characteristics in the provision of a subscriber line scanning circuit in an automatic telephone system.

It is also an object of this invention to simplify the high speed scanning of subscriber lines in an automatic telephone system to simultaneously effect the detection of a request for service or other information and the determination of the identity of the requesting subscriber.

The foregoing and other objects of this invention are attained in one specific illustrative embodiment thereof having as a basic component a shift register, the individual stages of which may be set to either of two stable, electrically discernible states. According to one feature of this invention the scanning of input lines is accomplished by a shift register in which the two-state elements comprise magnetic cores having substantially rectangular hysteresis characteristics. Such a shift register is advantageously utilized in this invention for this purpose and is arranged in a well-known two-core-per-bit configuration. In the register an information bit in the form of a particular one of the states, in this case, one of two states of remanent magnetization, may be introduced into a particular stage either by shifting it serially from an immediately preceding stage or by introducing it parallelly via inputs individually associated with each of the stages. In the application of a magnetic core shift register in the present invention both of these means are employed as will be explained in detail hereinafter, and it is another feature of this invention that a service request in an automatic telephone system may be made to appear by means of its relative position represented in the shift register.

Associated with each core of the register is a subscriber line circuit of the telephone system and it is an important feature of this invention that each subscriber line circuit includes an input winding inductively coupled to its associated core. Since, in the illustrative embodiment of the invention being described the shift register is of the two-core-per-bit type, the subscriber line circuits are arranged in two groups, with the line circuits of each group being associated with corresponding cores of the two-core stages. This arrangement is in accordance with another feature of this invention in which the cores of the shift register are most economically utilized. Generally in the employment of a magnetic core shift register one core of each stage constitutes the storage core and the other the transfer code. Thus only one information bit is conventionally stored in each two-core stage and that in the storage core. The transfer core then simply provides a means for temporarily retaining the information while the shift from one stage to another is made.

In the present invention a storage core for a subscriber line of one group constitutes the transfer core for a subscriber line of the other group. Thus the function of each core of a stage alternates between that of storage and transfer and each core serves a dual purpose.

The line circuits of each group have further associated therewith a common source of potential which is alternately connected to all of the line circuits of each of the two groups. The source of potential will have no effect while the line circuits are open. However, should a subscriber have removed the telephone subset handset from the subset cradle, thus initiating a request for service, the hookswitch will have operated to close the subscriber line circuit. When the source of potential is thereupon applied to the group of lines of which the subscriber line requesting service is part, a current will be initiated through the core winding connected to the subscriber line circuit requesting service. The magnetic core associated with the latter subscriber line would be driven, by the magnetomotive force developed by the current flow, to a particular condition of remanent magnetization, hereafter to be referred to herein as the "set" magnetic condition.

In the conventional manner, by means of alternately applied periodic advance currents to the advance circuits of the register, the set condition is shifted serially from stage to stage via loop circuits coupling the cores. This shift is accomplished, as is well known, by successively "resetting" the cores after they have been driven to the set condition, that is, switching the magnetic condition of the cores corresponding to the set condition to that corresponding to a "reset" condition. When the last core of the register is reset an output pulse is developed which pulse is effective to control the interruption of the generating means applying the periodic advance currents.

According to another feature of this invention, the periodic advance currents applied to the shift register are counted and in this manner the number of such periodic advance currents applied to shift a set magnetic condition out of the register is determined. It is readily apparent that the count thus obtained bears a direct correlation to the position in the group of subscriber lines of the line circuit which was instrumental in setting its associated core. Although any suitable well-known counting circuit may be employed in this connection, one comprising magnetic cores of the character also used in the shift register was found highly advantageous for this purpose in this invention.

A means for generating and end-of-count signal when the counting circuit has advanced through a complete cycle of its operation is another feature of this invention and the signal is operatively applied to control the resetting of the latter counting circuit. The end-of-count signal also accomplishes the function of controlling the switching of the potential source from its application to one group of subscriber line circuits to the other group. Specifically, a pair of switches are alternately operated to perform this potential switching function.

According to still another feature of this invention the above-mentioned potential switching control means offers an advantageous index for determining the particular group of the groups of subscriber lines to which the active subscriber line belongs. This determination will in every case be manifested by noting, by means of associated line identification circuits not shown nor comprising an essential part of the present invention, the particular switch of the pair of switches which was in an operative state at the moment the count of the periodic advance currents was initiated. The ambiguity of the identity of the calling subscriber introduced by associating a subscriber line with each core of a two-core storage stage of the shift register is thus readily resolved.

A feature of this invention insuring the positive determination of the fact of a request for service or other information appearing on a subscriber line input is the shift register arrangement whereby an output signal is generated only if and when one or more of the cores of the register has been initially set by an information input. Thus, assuming no request for service by a subscriber immediately following one already recognized by the scanning circuit, the shift register will be completely cleared when the output signal appears in the output circuit of the last core of the register. An output signal accordingly is unambiguous and can be determinative of only one occurrence with which the system is concerned.

Associated control and switching circuits of the telephone system not shown nor comprising an essential part of this invention may, after the request for service has been accepted, establish a path from the calling subscriber line through well-known concentrator switches to register equipment. The latter equipment may then accumulate the subsequent information introduced under the control of the calling subscriber on the subscriber line in accordance with the nature of the service requested. This information is conventionally introduced in the form of dial pulses and such dial pulses themselves may be detected by scanning of the lines provided only that the repetition rate of the scanning of individual lines is sufficiently high. A time division scanning arrangement of the character contemplated in the present invention accordingly may be adapted to detect either a single electrical occurrence appearing on an input line or series of such occurrences and any coding represented by the particular sequence of such occurrences.

The foregoing and other features of this invention will be understood from a consideration of the detailed description of the invention which follows when taken in conjunction with the accompanying drawing in which.

*General description of organization and structure*

The illustrative embodiment of the invention described herein is most advantageously depicted by representing the magnetic cores and attendant circuits in the well-known mirror symbol notation. This convention is described in detail by M. Karnaugh in the Proceedings of the I.R.E., vol. 43, of May 1955, at page 570. Briefly, the magnetic cores are represented by vertical line segments, core winding leads by horizontal line segments, and the windings by 45-degree mirror symbols at the intersections of the vertical cores and horizontal leads. The sense of the magnetic field associated with a current in a given winding is obtained by "reflecting" the current in the winding mirror symbol. To find the direction of the electromotive forces induced when the applied field switches the core, reverse the field and reflect it in each winding mirror symbol.

Figure 1:
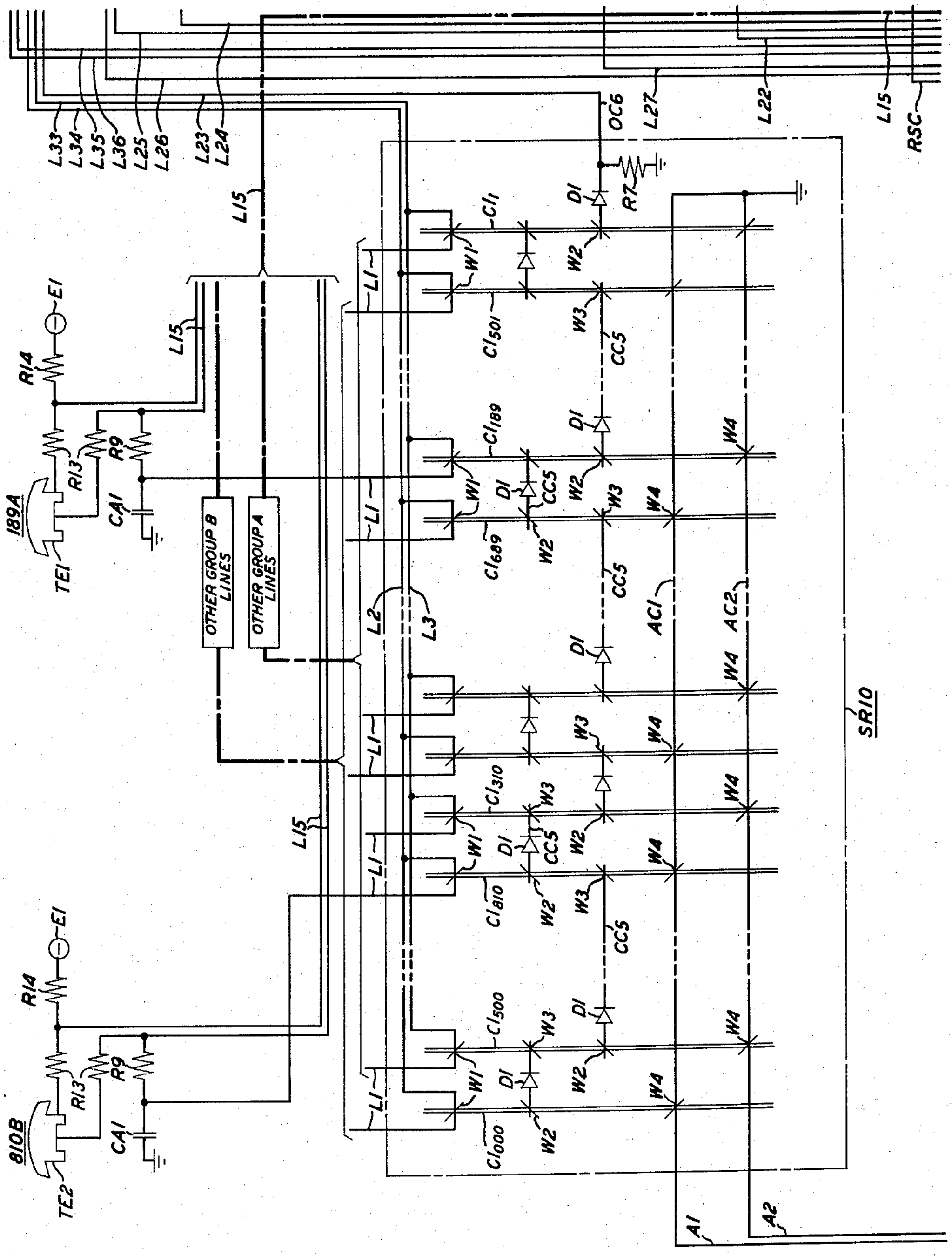
Figs. 1 through 7 are a detailed schematic representation of one specific illustrative embodiment of this invention.

As shown in the assembled figures of the drawing, the particular illustrative embodiment of this invention described herein comprises broadly a magnetic core shift register SR10. The register SR10 is shown in Fig. 1 and is driven by an advance pulse generator P20 shown in Fig. 2. The output circuit of register SR10 is connected to a service request detector D70 of Fig. 7. Each stage of the shift register SR10 comprises a pair of magnetic cores and each of the cores C1 has associated therewith a telephone subscriber subset such as the subsets TE1 and TE2. The subscriber subsets may also be connected in a convenional manner to a central office switching network SN65 shown in Fig. 6 of the drawing only as a block symbol. For purposes of showing the organization of this invention in connection with a common control telephone system, a 1000 line exchange is assumed in which the subscriber lines are arranged in two groups designated herein as the A group and the B group. The shift register SR10 accordingly comprises 500 two-core stages of which only representative stages are shown in Fig. 1 of the drawing. Each of the subscriber subsets TE1 in the A group is associated with one core C1 of a core-pair stage of the register SR10 and each of the subscriber subsets TE2 in the B group is associated with the other core C1 of a core-pair stage. For convenience the lines 1 through 500 are assigned to the second cores of the two-core stages and the lines 501 through 1000 are assigned to the first cores of the two-core stages. The lines of the two groups of lines thus alternate in their connection with the shift register with the result that the storage function of the shift register is most economically utilized.

Figure 2:
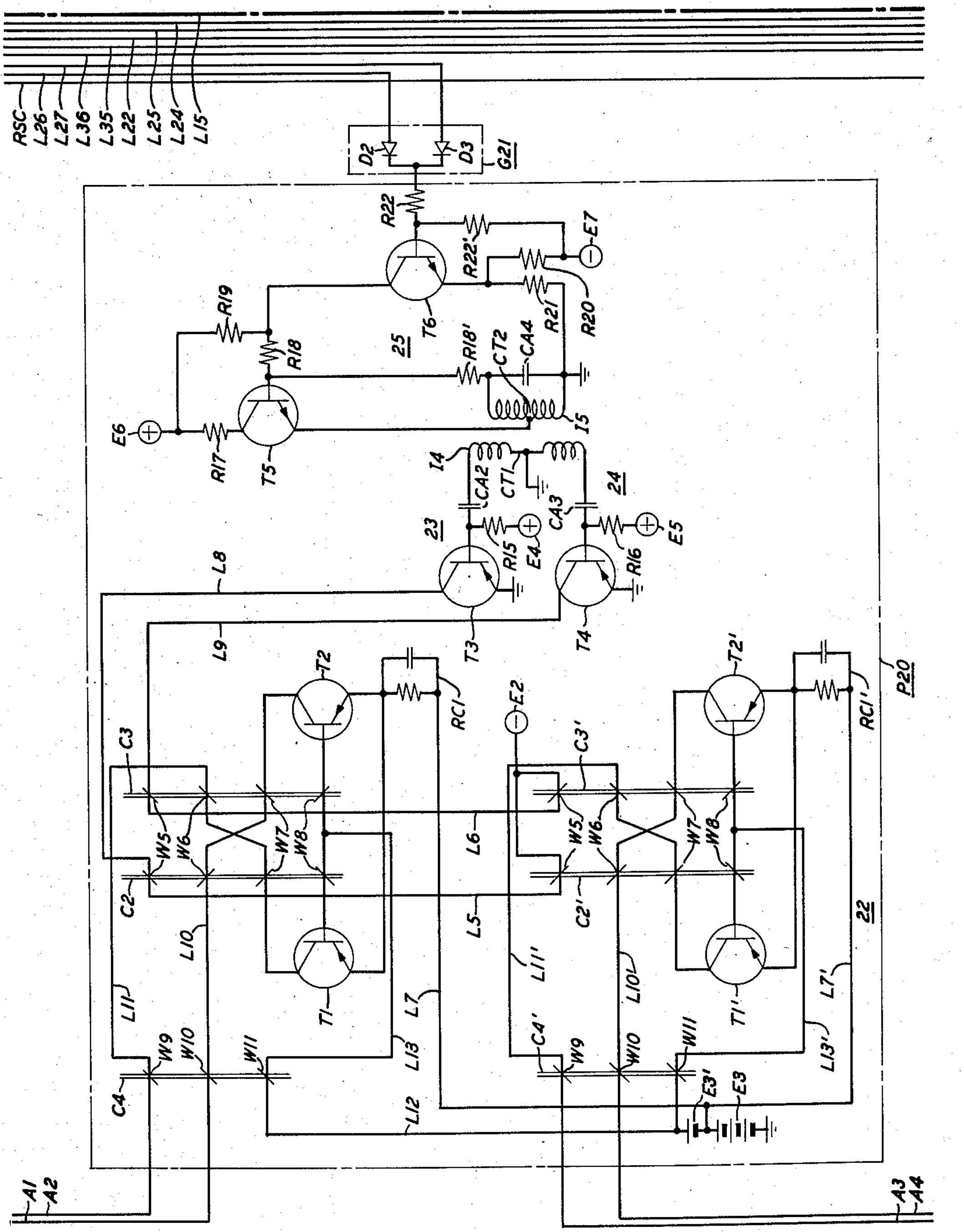
Figure 3:
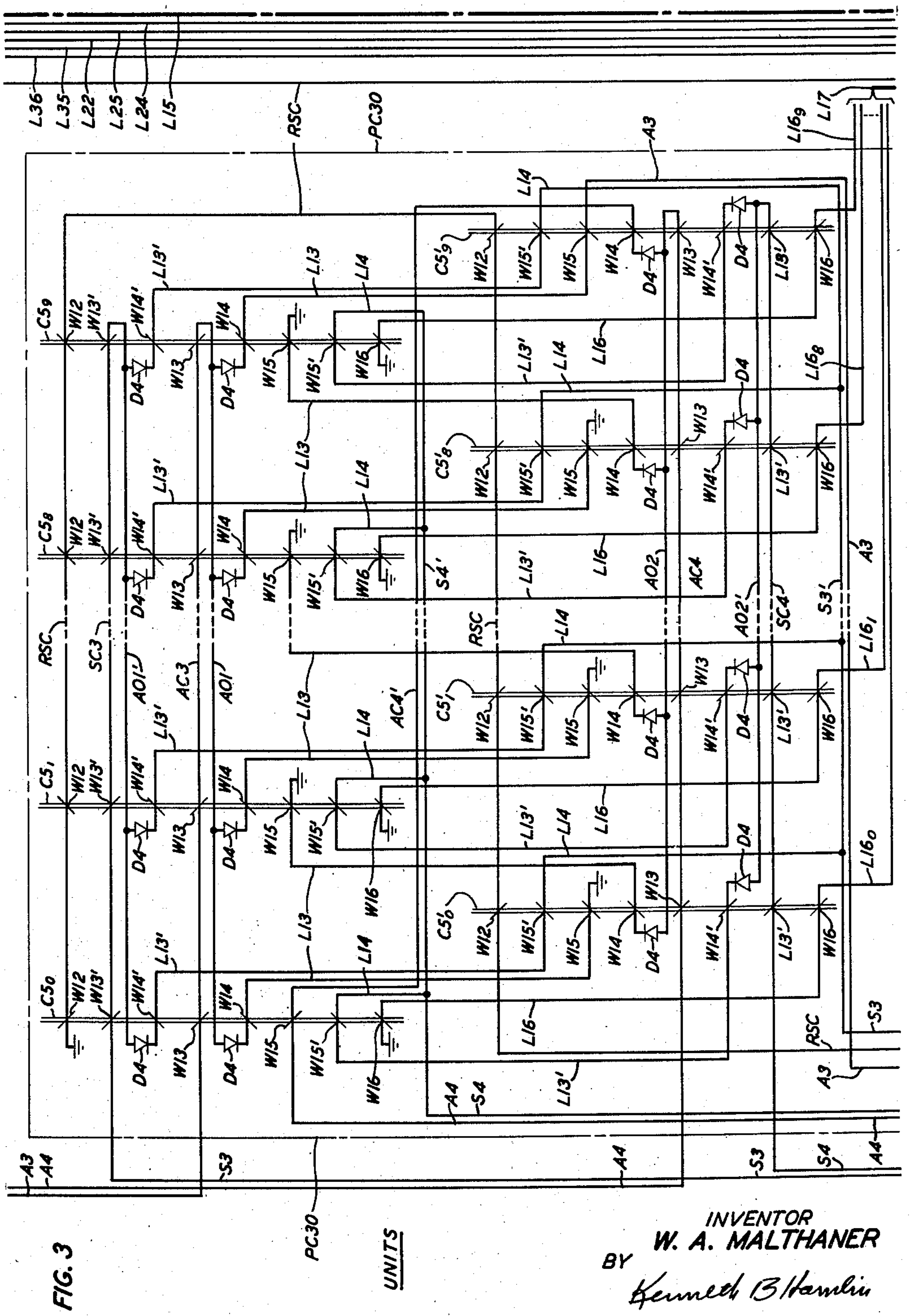
Figure 4:
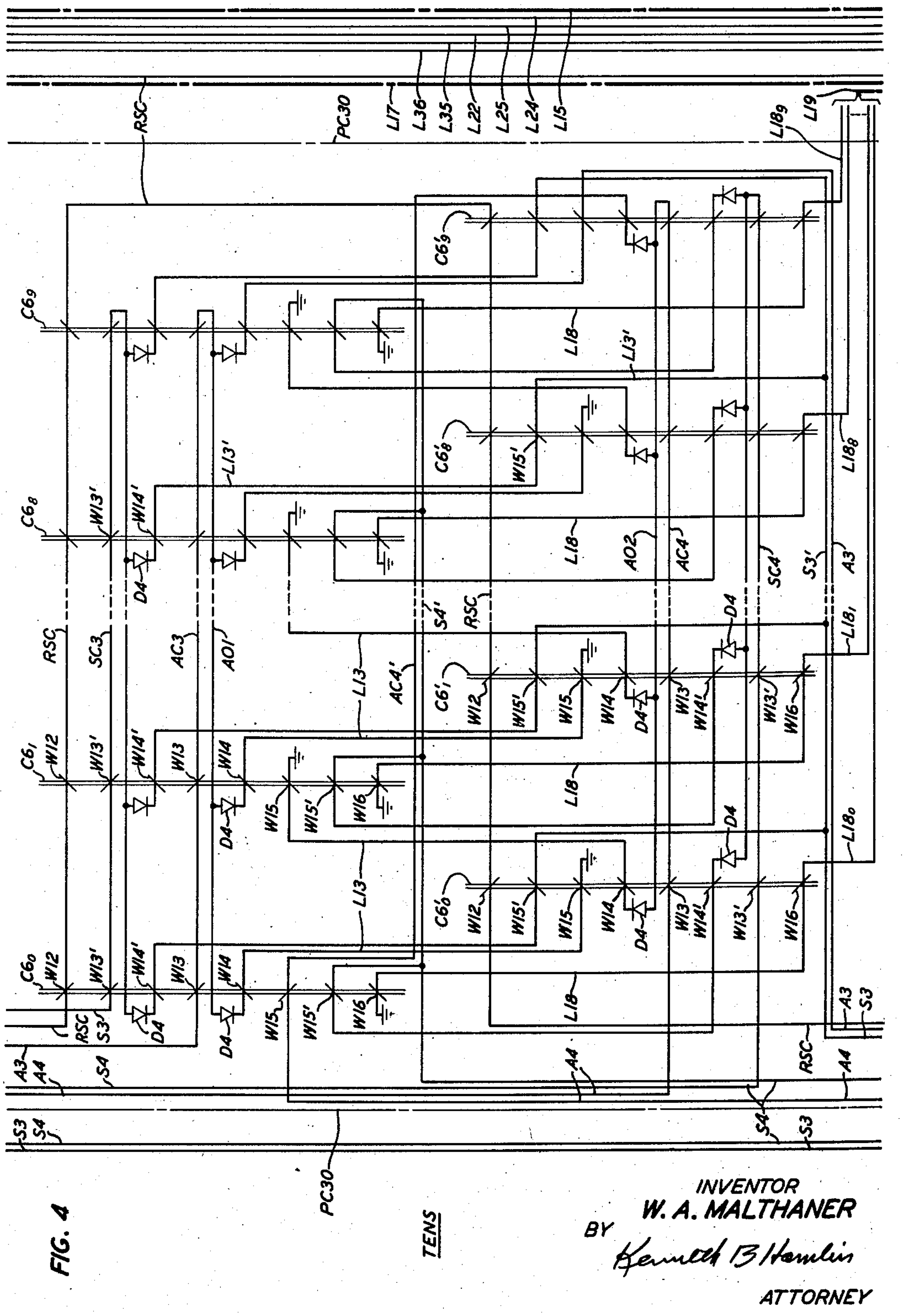
Figure 5:
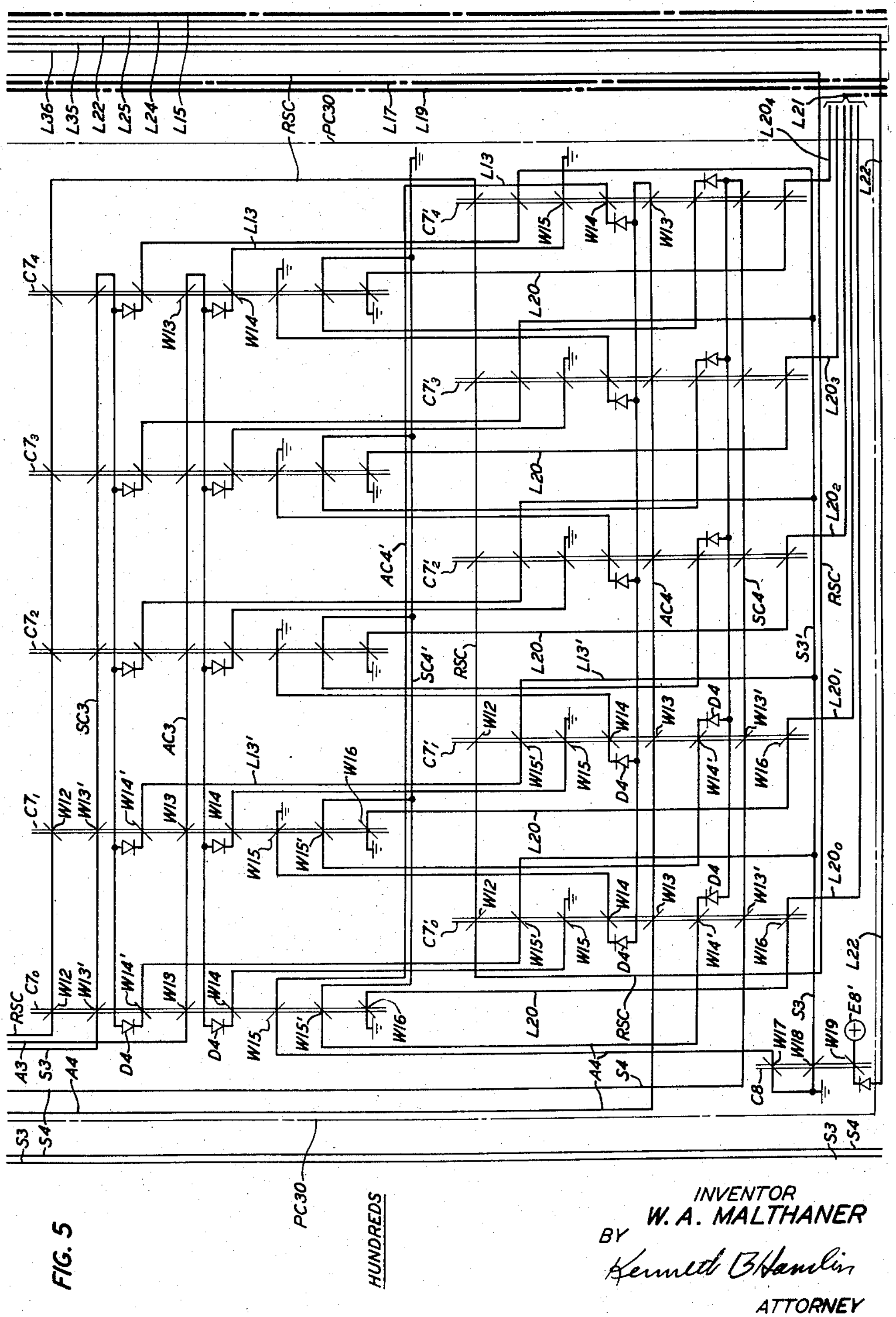
Figure 6:
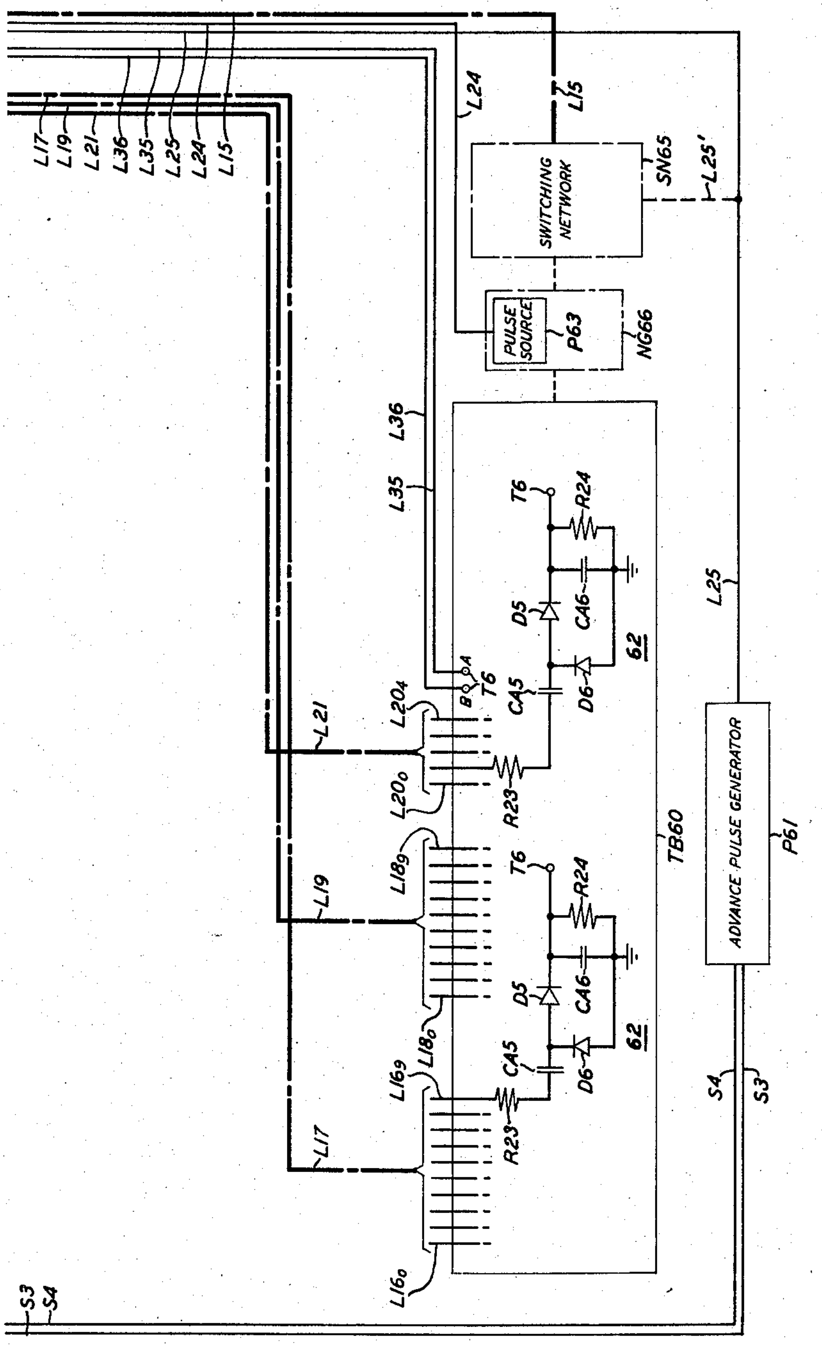
Figures 7, 8:
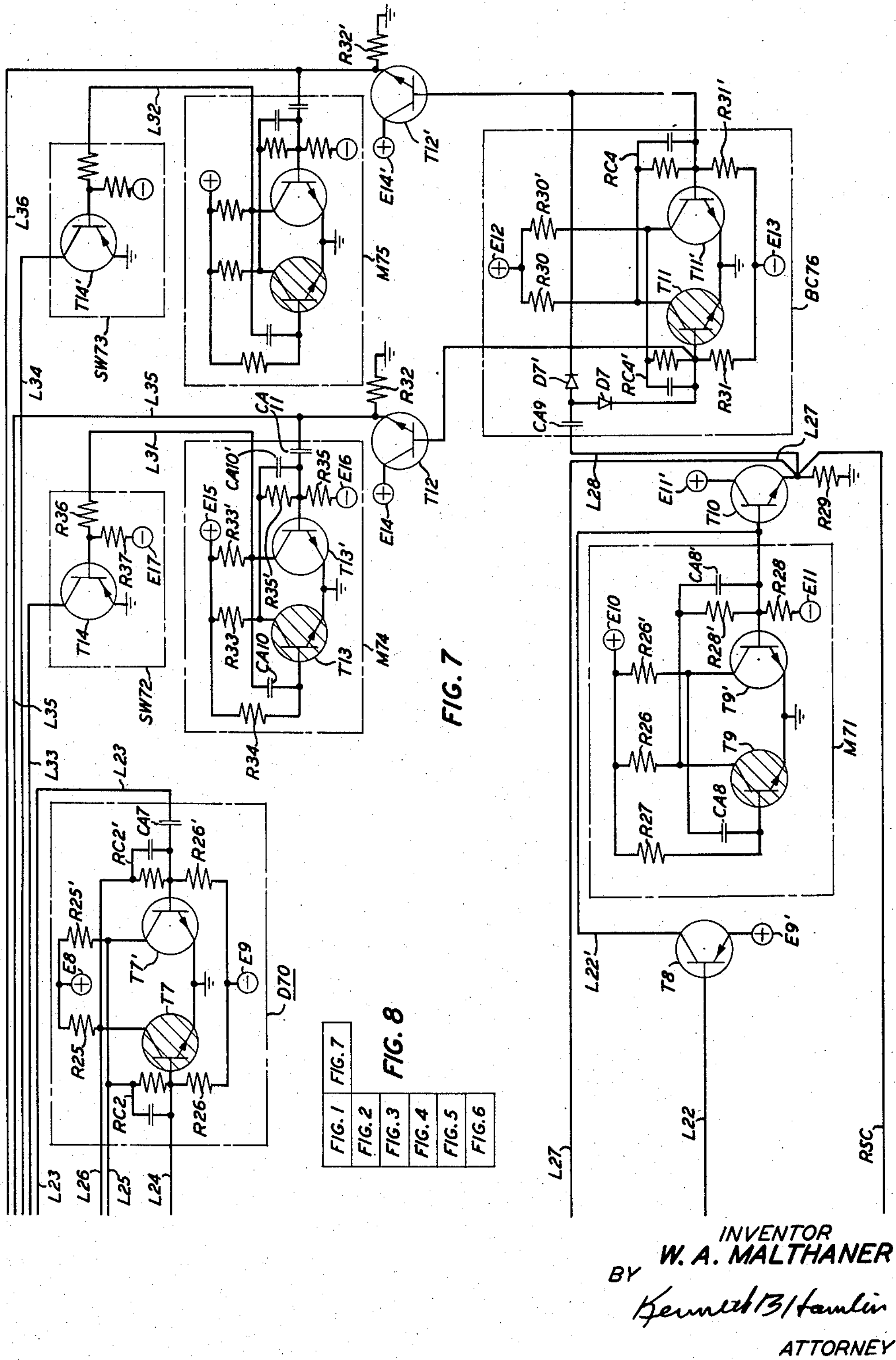
Fig. 8 shows the arrangement of the other figures of the drawing to present a complete schematic diagram of the embodiment of the invention.

An output from the service request detector D70, Fig. 7, connects through an OR gate G21 of Fig. 2 to the advance pulse generator P20 where control of the latter means is effected in a manner to be described in detail. Also driven by the advance pulse generator P20 is a pulse counting circuit PC30 having a hundreds, tens, and units section as shown in Figs. 5, 4, and 3, respectively. Outputs from the counting circuit PC30 corresponding to a particular count completed are advantageously available for line identification purposes by suitable circuits performing this function, not comprising a part of this invention, at a terminal block TB60, Fig. 6. An end-of-count monopulser M71 shown in Fig. 7 triggered by an output signal from the counting circuit PC30 in turn operates to produce a signal which functions both to control the advance pulse generator P20 and to reset the counting circuit PC30. Output signals manifesting a count registered in the counting circuit PC30 are produced under the control of a pulser P61 of Fig. 6 similar in operation to the advance pulse generator P30. The pulser P61 is in turn controlled by the service request detector D70 which serves simultaneously to interrupt the operation of the advance pulse generator P30 and to initiate the operation of the pulse generator P61.

Finally, the actual scanning of the subscriber lines is perfomed under the control of a pair of transistor switches SW72 and SW73 shown in Fig. 7 which operate to alternately apply a scanning potential to the group A and group B lines. The later switches are in turn controlled by monopulsers M74 and M75, respectively, which are alternately energized by the outputs of a binary counter BC76 also controlled by the output signal from the end-of-count monopulser M71. The outputs from the counter BC76 also provide a convenient means for determining the particular group of the two groups of lines in which a request for service or other information originates. These identification outputs may be utilized in any suitable manner by switching network equipment SN65 which may comprise further elements of the common control equipment understood to be part of the telephone system with which the present invention may be adapted for use. The switching network SN65 will be more particularly referred to hereinafter.

*Detailed description of organization and structure*

Returning now to the shift register SR10 depicted in Fig. 1, this register is shown to comprise a plurality of magnetic cores C1. The representative cores C1 of the register shown correspond to the telephone system subscriber lines with which they are associated and accordingly are correspondingly numbered. As will presently appear in connection with the description of the operation of this invention, the cores C1 are numbered in the reverse order, the normally last core of the register being in this case numbered as the first core. Each of the cores C1 with the exception of core $C1_{1000}$ is provided with a plurality of windings inductively coupled thereto including a setting winding W1, an output winding W2, an input winding W3, and an advance winding W4. Since core $C1_{1000}$ has no preceding core from which a set condition may be shifted no input winding W3 is there required. A plurality of coupling circuits CC5 each including a unilateral conducting element, such as a diode D1, an output winding W2, and an input winding W3, couple each of the cores C1 to a succeeding core of the register. An output circuit OC6 including a load resistor R7 and also including a diode D1 is connected to the output winding W2 of the last core $C1_1$ of the register. The advance windings W4 of corresponding cores of the core-pair stages of the register are serially connected to constitute a pair of advance circuits AC1 and AC2, both of which, after including the respective windings W4 of the cores C1, are terminated in a common ground. One side of each of the setting windings W1 is connected by means of a conductor L1 to a subscriber line circuit through a resistor R9. Alternate cores C1 have the windings W1 connected to alternating lines of the group A and group B subscriber lines as is apparent from the drawing. The other side of each of the windings W1 is connected to a scanning conductor individual to each of the group of lines. Thus, the windings W1 of the first cores C1 of the two-core stages are connected to the conductor L2 and the windings W1 of the second cores C1 of the two-core stages are connected to the conductor L3.

In connection with the description of the structure and operation of the shift register SR10 and, subsequently, of the counting circuit PC30, and elsewhere herein, the term "advance" is employed. This term is to be understood as referring to the shift or advance of a particular information-representative magnetic condition from one stage of a shift register or counting circuit, for example, to the succeeding stage or stages. When a shift register or counting circuit of the character here contemplated is activated, frequently in alternate phases, information represented as a particular condition is referred to as "advanced" along the circuit. Thus, the activating currents are referred to herein as advance pulses applied via an advance circuit to the advance windings of the cores.

Each of the subscriber line circuits includes, in addition to a subscriber subset such as the subsets TE1 and TE2, a source of negative potential E1, a resistor R14, line loop resistances represented by the resistors R13, and a capacitor CA1 connected between the subscriber line side of the setting winding W1 and ground. Each of the subscriber line circuits may also be connected via circuit means represented by conductors L15 to central office switch network SN65 referred to previously and to be generally described hereinafter.

Adjunctive to the shift register SR10 itself is the advance pulse generator P20 which provides the alternate periodic advance pulses for driving the shift register. The generator P20 comprises essentially a pulsing circuit 22, a pair of trigger circuits 23 and 24, and a start-stop oscillator 25. The pulsing circuit 22, by means of a pair of pulsing sections, generates a duplicate set of identical pulses for simultaneously driving the shift register SR10 and the counting circuit PC30 as referred to hereinbefore. The section 22 is arranged symmetrically and comprises two pairs of magnetic cores C2 and C2′, and C3 and C3′. Each core has a switching winding W5, a setting winding W6, another switching winding W7, and a trigger winding W8 inductively coupled thereto. The switching windings W5 of the pairs of cores C2 and C2′, and C3 and C3′ are serially connected through the conductors L5 and L6, respectively, to a common source of negative potential E2. The cores C2, C2', C3, and C3' have associated therewith transistors T1, T1', T2, and T2', respectively. The bases of the transistors T1 and T2 are connected together through the trigger windings W8 of the cores C2 and C3, respectively, and the bases of the transistors T1' and T2' are connected together through the trigger windings W8 of the cores C2' and C3', respectively. The collector of each of the transistors connected base-to-base is connected to an output of the pulser P20 through a switching winding W7 of its associated core and the setting winding W6 of the core associated with the other of the base-to-base connected transistors. The emitters of the transistors T1 and T2 are connected together and to one side of a resistance-capacitance network RC1. Similarly, the emitters of the transistors T1' and T2' are connected together and to one side of a resistance-capacitance network RC1'. The other side of both of the networks RC1 and RC1' is connected to a positive potential source E3 by means of the conductors L7 and L7'. Each section of the pulsing circuit 22 has individually associated therewith a compensating core C4 and C4', which latter cores each have inductively coupled thereto windings W9, W10, and W11. The trigger circuits 23 and 24 comprise, respectively, transistors T3 and T4 having their emitters grounded and their bases connected through resistors R15 and R16 to positive potential sources E4 and E5, respectively. The bases of the transistors T3 and T4 are also connected, respectively, through capacitors CA2 and CA3 to opposite ends of a transformer secondary winding I4 which winding is center tapped to ground at CT1.

Advance pulse frequency control is effected by a start-stop oscillator 25 comprising a transistor amplifier T5 having its collector connected through a load resistor R17 to a positive potential source E6. The emitter of the transistor T5 is connected to a tap CT2 of a transformer primary winding I5 which winding together with a paralleled capacitor CA4 comprises the tank circuit of the oscillator 25. The base of the transistor T5 is connected through a resistor R18 to the collector of a second transistor T6 comprising a control switch for the start-stop oscillator 25 and through a resistor R18' to the above tank circuit. The latter collector is also connected through a resistor R19 to the positive potential source E6 and the emitter of transistor T6 is connected to a negative potential source E7 and to a ground potential point through resistors R20 and R21, respectively. Control of the transistor T6 switch is effected by signals applied to its base through a resistor R22 from a logical OR circuit G21 comprising a pair of diodes D2 and D3. The transistor T6 is normally held cut off by a negative potential applied to its base from the source E7 applied through a resistor R22'. The circuits alternately controlling the pulsing circuit 22 may now be traced from ground at the emitters of the transistors T3 and T4, conductors L8 and L9, switching windings W5 of the cores C2 and C3, conductors L5 and L6, switching windings W5 of the cores C2' and C3', respectively, to the negative potential source E2. The advance current circuits for the shift register SR10 may be traced as follows: for the cores C1 associated with the B group of subscriber lines, from the positive potential source E3, conductor L7, network RC1, emitter of the transistor T2, collector of the transistor T2, switching winding W7 of the core C3, setting winding W6 of the core C2, conductor L10, winding W10 of the compensating core C4, conductor A1, and the activating windings W4 of the advance circuit AC1 of the first cores C1 of each core-pair stage to ground. For the cores C1 associated with the A group of subscriber lines a similar circuit may be traced as follows: from the positive potential source E3, conductor L7, network RC1, emitter of the transistor T1, collector of the transistor T1, switching winding W7 of the core C2, setting winding W6 of the core C3, conductor L11, winding W9 of the compensating core C4, conductor A2, and the activating windings W4 of the advance circuit AC2 of the second cores C1 of each core-pair stage to ground. The base circuit for each of the transistors T1 and T2 is traced from the positive potential source E3', conductor L12, winding W11 of the compensating core C4, conductor L13, and the trigger windings W8 of the cores C2 and C3 to the respective bases.

The advance pulse generator P20 is also operated to provide advance currents for the counting circuit PC30 shown in Figs. 3, 4, and 5. The latter circuit is divided into units, tens, and hundreds sections, only the latter section of which is shown in its entirety. The counting circuit PC30 employs the principle of operation described by M. Karnaugh in Patent 2,719,773, issued October 4, 1955, in which the output windings of the cores are connected to the last of the series connected activating windings. In the particular adaptation of this principle to the present counting circuit PC30 the loads to which the advance current is directed are constituted by input windings of the alternating cores. A separate activating circuit and parallelly connected output network is thus provided for the alternating cores with the result that by the alternate application of advance pulses to the activating circuits of the alternate cores a set magnetic condition may be stepped along the core sections. In addition, a second activating circuit, to be referred to herein as the shuttle activating circuit, and parallelly connected output network is provided for each of the alternating cores. The latter output networks are connected in a manner such that as the second alternating advance pulses, or shuttle advance pulses, are applied, a set magnetic condition is shuttled between alternate cores to which the condition was stepped by the first advance pulses. Finally, by means of shuttle circuit means coupling alternate cores, the shuttling of the set condition develops an output voltage which may be detected as indicative of the position in the counting circuit section to which the set magnetic condition has been stepped.

More particularly, the units section of the counting circuit PC30 shown in Fig. 3 of the drawing comprises two groups of magnetic cores arranged in an alternating sequence, the first group comprising the magnetic cores $C5_0$, $C5_1$ . . . $C5_8$, and $C5_9$, and the second group comprising the magnetic cores $C5'_0$, $C5'_1$ . . . $C5'_8$ and $C5'_9$. Each of the cores C5 and C5' has inductively coupled thereto a reset winding W12, a pair of activating windings W13 and W13', a pair of output windings W14 and W14', a pair of input windings W15 and W15', and a shuttle winding W16. The reset windings W12 of each of the cores C5 and C5' are serially connected by means of a reset conductor RSC and it should be noted that the reset winding W12 of the core $C5_0$ is wound in an opposite sense from that of the reset windings W12 of the remaining cores $C5_1$ through $C5_9$ and $C5'_0$ through $C5'_9$. The activating windings W13 of the cores C5 are serially connected by means of an advance circuit conductor AC3 and the activating windings W13 of the cores C5' are serially connected by means of an advance circuit conductor AC4. The conductors AC3 and AC4 then connect respectively to the second outputs of the dual pulse generator P20 of Fig. 2 via the conductors A3 and A4. The activating windings W13' of the cores C5 and C5' are serially connected respectively by means of shuttle advance circuit conductors SC3 and SC4, the latter conductors being part of the shuttle activating circuit which are connected to the outputs of the pulse generator P61 via, respectively, the conductors S3 and S4, also comprising part of the shuttle activating circuit.

In accordance with the general description of the principles controlling the operation of the counting circuit PC30 referred to hereinbefore, the output windings W14 of the cores C5 and C5' connect respectively to the activating windings W13 of the last cores $C5_9$ and $C5'_9$ by means of output circuit conductors AO1 and AO2. Between each of the output windings W14 and the conductors AO1 and AO2 are interposed the diodes D4 and each of the output windings W14 is connected via circuit means L13 to the input winding W15 of the next succeeding alternating core. Thus, the output winding W14 of the core $C5_0$ is connected via a conductor L13 to the input winding W15 of the core $C5'_0$ and the output winding W15 of the core $C5'_0$ is connected via a conductor L13 to the input winding W15 of the core $C5_1$. The counting circuit PC30 is of the re-entrant type so that the output winding W14 of the core $C5'_9$ is connected by means of a conductor AC4' to the input winding W15 of the core $C5_0$.

In a similar manner the output windings W14' of the cores C5 and C5' connect respectively to the activating windings W13' of the last cores $C5_9$ and $C5'_9$ by means of conductors AO1' and AO2'. Between each of the output windings W14' and the conductors AO1' and AO2' are also interposed diodes D4 and each of the output windings W14' of the cores C5 is connected via a conductor L13' to the input winding W15' of the next succeeding alternating core C5'. Each of the output windings W14' of the cores C5' is connected via a conductor L13' to the input winding W15' of the next preceding alternating core C5.

It is apparent from Fig. 3 that the activating circuits which are energized by means of the conductors A3 and A4 to step a set magnetic condition along the counting section, terminate in ground at one end of each of the input windings W15 of the cores C5 and C5' with the exception of the cores $C5_0$ and $C5'_9$. In the latter case, since the advance pulses from the second section of the generator P20 supply all of the sections of the counting circuit PC30, the advance pulses are simultaneously applied to the succeeding tens section by means of the continued conductors A3 and A4 connected to the last output windings W15 of the cores $C5'_9$ and $C5_0$, respectively. The succeeding tens and hundreds section of the counting circuit PC30 are thus energized by the advance pulses from the generator P20 only when the units section has counted through a complete cycle of its operation and it is only in connection with the cores $C5'_9$ and $C5_0$ that the output circuits including the conductors A3 and A4 must be further extended. In this manner and in the manner to be described, the advance pulse circuits originating in the advance pulse generator P20 are also extended through the succeeding hundreds section.

The alternate shuttle advance pulses supplied by the generator P61 upon its energization are simultaneously applied to the shuttle activating circuits of all of the sections of the counting circuit PC30. This is necessary, as will be described in detail, for the obvious reason that to determine a count at any given moment it is necessary to shuttle the set conditions between the core pairs wherever they appear in the sections of the counting circuit PC30. Accordingly, each of the input windings W15' of the cores C5 and C5' is connected via a conductor L14 to the conductors S4' and S3' which in turn are extended via the conductors S4 and S3 respectively to comprise the shuttle activating circuits for the succeeding tens section of the counting circuit PC30 as will presently be described.

Finally, the shuttle windings W16 of each of the cores of the core pair stages are connected by means of a conductor L16 to complete a circuit extending from ground at each of the windings W16 of the cores C5 to output terminals T6 shown in Fig. 6 of the drawing. Particularly, each of the conductors L16 is extended beyond the shuttle windings W16 of the cores C5' to a voltage doubling circuit 62 shown in Fig. 6 by means of a cable L17. Thus, the conductors $L16_0$, $L16_1$ . . . $L16_8$ and $L16_9$, representing the parallel outputs of each stage of the units section of the counting circuit PC30, extend through the cable L17, an output voltage doubling network comprising a series resistor and capacitor R23 and CA5, a diode D6 to ground, a further series, diode D5 to a paralleled resistor R24 and capacitor CA6 and to terminals $T6_0$, through $T6_9$. At the terminals T6 an output voltage indication of a units count may advantageously be detected by suitable line identification equipment understood as being associated with the switching network SN65 which may also be associated with this invention. This output voltage would be taken across a network to ground comprising paralleled resistor R24, capacitor CA6.

The tens section of the counting circuit PC30 shown in Fig. 4 is identical in operation and organization in every respect to the units section described immediately hereinbefore. Two groups of magnetic cores are again arranged in an alternating sequence, the first group comprising the magnetic cores $C6_0$, $C6_1$ . . . $C6_8$, and $C6_9$, and the second group comprising the magnetic cores $C6'_0$, $C6'_1$ . . . $C6'_8$, and $C6'_9$. Each of the cores has inductively coupled thereto the windings described in detail for the units section above and, since the identical function is performed for each, have been designated by the same numerical characters. Thus the cores $C6_0$ and $C6_1$, and cores $C6'_0$ and $C6'_1$, for example, also each has a reset winding W12, a pair of activating windings W13 and W13', a pair of output windings W14 and W14', a pair of input windings W15 and W15', and a shuttle winding W16 inductively coupled thereto. The reset windings W12 are also serially connected together and to the reset windings W12 of the cores of the units section by means of the extended conductor RSC. The corresponding windings of the cores of the tens section are similarly identically connected by conductor means which have been correspondingly identically designated.

The activating circuits originating in the pulse generator P20 extend therefrom to the tens counting section from the preceding units section, described above, via the conductors A3 and A4. The latter conductors connect respectively to the advance circuit conductors AC3 and AC4 which serially connect the activating windings W13 of the cores C6 and C6' of the tens section. After extending through the output networks of the cores of the tens section, the activating circuits originating in the advance pulse generator P20 continue via the conductors A3 and A4 to the succeeding hundreds section of the counting circuit PC30. In a similar manner the shuttle activating circuits originating in the pulse generator P61 of Fig. 6 extend therefrom to the tens section from the preceding units section via the conductors S3 and S4. The latter conductors connect respectively to the shuttle circuit conductors SC3 and SC4 which serially connect the activating windings W13' of the cores C6 and C6' of the tens section. After extending through the output networks of the cores of the tens section, the shuttle activating circuits originating in the advance pulse generator P61 continue via the conductors S3 and S4 to the succeeding hundreds section of the counting circuit PC30. The shuttle windings W16 of the cores of the tens section are organized in a manner similar to that of the units section and connect by means of conductors L18 to the terminals T6 of the terminal block TB60 of Fig. 6 which terminals also are available to suitable line identification equipment associated with the switching network SN65. Particularly, each of the conductors $L18_0$, $L18_1$ . . . $L18_8$ and $L18_9$ is extended to a voltage doubling circuit 62, shown in Fig. 6 and described in connection with the units section above, by means of a cable L19.

The hundreds section of the counting circuit PC30 shown in Fig. 5 of the drawing is similar in operation and organization to the units and tens sections described above. Two groups of magnetic cores are again arranged in an alterinating sequence, the first group comprising the magnet cores $C7_0$ through $C7_4$ and the second group comprising the magnetic cores $C7'_0$ through $C7'_4$. Each of the cores has again inductively coupled thereto the windings described in detail for the units and tens sections above and, since the identical function is performed by each, have been designated by the same numerical characters. Thus, the cores $C7_0$ and $C7_1$, and cores $C7'_0$ and $C7'_1$, for example, each has a reset winding W12, a pair of activating windings W13 and W13', a pair of output windings W14 and W14', a pair of input windings W15 and W15' and a shuttle winding W16 inductively coupled thereto. The reset windings W12 are also serially connected together and to the reset windings W12 of the cores of the units and tens section by means of the extended conductor RSC. The corresponding windings of the cores of the hundreds section are similarly identically connected by conductor means which have been correspondingly identically designated. It should be noted that the hundreds section comprises only five two-score stages. Since each of the groups of subscriber lines includes only 500 of such lines, in no instance would a count beyond 500 be necessitated, and accordingly only five counting stages are provided in the hundreds section of the counting circuit PC30.

The activating circuits originating in the pulse generator P20 extend therefrom to the hundreds counting section from the preceding tens section via the conductors A3 and A4. The latter conductors connect respectively to the advance circuit conductors AC3 and AC4 which serially connect the activating windings W13 of the cores C7 and C7' of the hundreds section. After extending through the output networks of the cores of the hundreds section, the activating circuits originating in the advance pulse generator P20 extended by means of the conductors A3 and A4 are now terminated. One of the circuits, extending via the conductor A3, is terminated at ground on one side of each of the input windings W15 of the cores C7'. The other circuit, extending via the conductor A4, continues via a conductor AC4' and the input winding W15 of the core $C7_0$ to perform one final function. A single core C8, the operation of which will be explained in detail hereinafter, is provided having a switching winding W17, a setting winding W18, and an output winding W19, inductively coupled thereto. The advance circuit extended by means of the conductor A4 to the hundreds section of the counting circuit PC30 finally extends from one side of the input winding W15 of the core $C7_0$ through the switching winding W17 of the core C8 to ground.

The shuttle activating circuits originating in the pulse generator P61 of Fig. 6 extend therefrom to the hundreds section from the preceding units and tens section, described above, via the conductors S3 and S4. The latter conductors connect respectively to the shuttle circuit conductors SC3 and SC4 which serially connect the shuttle activating windings W13' of the cores C7 and C7' of the hundreds section. After extending through the output networks of the cores of the hundreds section, the shuttle activating circuits originating in the advance pulse generator P61 are also finally terminated. The shuttle activating circuit extended via the conductor S3 is finally connected to ground through the conductor S3' and the switching winding W18 of the core C8. The circuit extended via the conductor S4 is finally connected to ground via a conductor S4' and the input windings W15' of the cores C7. The shuttle windings W16 of the hundreds section are organized in a manner similar to that of the units and tens sections and also connect, by means of conductors L20, to the terminal T6 of the terminal block TB60 which again are available to suitable line identification equipment associated with the switching network SN65 represented symbolically in Fig. 6. Particularly, each of the conductors $L20_0$ through $L20_4$ is extended to a voltage doubling circuit 62 shown in Fig. 6, described in detail in connection with the units section above, by means of a cable L21. The reset circuit which terminated at ground at one side of the reset winding W12 of the core $C5_0$ of the units section is extended via the conductor RSC to the output of an emitter-follower comprising the transistor T10 shown in Fig. 7 of the drawing.

The shuttle advance pulse generator P61 indicated only in block symbol form in Fig. 6 is identical to the advance pulse generator P20 described earlier herein, with the exception that only a single pulsing section is required. Since only a single set of alternating advance pulses is required for the shuttle activating operation only cores corresponding to the cores C2 and C3 and the outputs A1 and A2 are required in the shuttle advance pulse generator P61.

Returning now to the shift register SR10 of Fig. 1, the output circuit OC6 thereof is seen to connect via a conductor L23 to the input of the service request detector D70, shown in Fig. 7. The detector D70 is substantially a flip-flop circuit comprising the transistors T7 and T7' the emitters of which are grounded and the collectors of which are connected respectively through the resistors R25 and R25' to a positive potential source E8. The bases of the transistors T7 and T7' are connected respectively through the resistors R26 and R26' to the negative potential source E9. The conductor L23 extending from the output circuit OC6 of the shift register SR10 is connected to the base of the transistor T7 through a capacitor CA7 and signals supplied via the conductor L23 provide one control for the detector D70. A second control is afforded via a conductor L24 connected to the base of the transistor T7' which conductor extends from a pulse source P63 shown only in block symbol form in Fig. 6. The pulse source P63 may advantageously be adapted to control the operation of the service request detector D70 in any convenient manner compatible with the operation of the present invention. Thus, for example, it may be energized under the control of, and responsive to the completion of the line identification function by suitable line identification equipment associated with a switching network SN65. Such control means however, does not constitute an essential part of the present invention.

A number of references have been made herein to the switching network SN65 shown in block symbol form in Fig. 6 and it may be helpful at this point to provide a broad description of this network with which the present invention may be employed. Such a network should preferably operate at a high rate of speed to exploit to the fullest extent the advantages of the present invention and should operate to establish a single requested connection between two points in response to an applied order signal. Networks of the type which may be employed with this invention include, among others, those described in Patent 2,686,837, issued August 17, 1954, of S. T. Brewer and E. Bruce, and in Patent 2,668,195, issued February 2, 1954, of S. T. Brewer.

In connection with the operation of the present invention being described, the two points to be connected might be the subscriber subset 189A and a means for receiving and registering subsequent information signals appearing on the subscriber line such as, for example, subscriber dial pulses. In this connection reference may be had to the patent previously referred to herein, No. 2,723,311, in which is also employed a switching network such as that with which the present invention is adaptable and which may also be of the type described in the above-identified patents. More particularly this switching network is designated as the network 49 shown in Figs. 2A and 40 of that patent. Control of the switching network 49 as described therein is achieved by a number group circuit 250 performing a marking function responsive to the line identification signals. These signals would correspond to the signals available on the terminals T6 of the present invention in the manner to be described. The number group circuit 250 performing the marking function is shown in Figs. 2A and 34 through 39 of the patent referred to above and may also be associated with the present invention as indicated by the block symbol NG66 in Fig. 6. In connection with the description of the switching network control circuit 250, it is explained that when a desired connection is established with a calling subscriber or one requesting service, an "OK" signal is generated which is indicative of the completion of the line identification operation and the switching operations predicated on this identification. Although this signal in the circuit of the patent is of negative polarity, its occurrence in time with respect to a subscriber line scanning function is ideally suited, after inversion, for its utilization in the sequence of operations of the elements of the present invention.

Thus, assuming the adaptation of the present invention to a telephone system such as that described in the Patent No. 2,723,311, above referred to, the signal designated as the "OK" signal would be produced when the subscriber line identification operation and subsequent switching operations have been completed. Accordingly, and referring to Fig. 34 of this patent, the pulse source P63 of the present invention would comprise the gas discharge tube 359 and the pulse generated would be the inverted pulse 282 which would then be applied via the conductor L24 to control the service request detector D70 in the manner to be described. It is to be understood that the positive signal on the conductor L24 may be supplied in any other convenient manner known to one skilled in the art with the only limitation imposed being that it appear only when the line identification and subsequent switching operations referred to have been completed.

To conclude the description of an illustrative adaptation of the present invention, one other adaptation may be made in connection with the application to the telephone system described in the Patent No. 2,723,311. To initiate the operation of the assumed switching network SN65, a signal transmitted via a conductor L25 to control the pulse generator P61 in the manner to be described, would also be applied to the network SN65 via a conductor L25'. Referring to Fig. 33 of the cited patent, the conductor L25' would be extended as the conductor 281 of the Fig. 33 and the signal, after suitable inversion, would comprise the required start signal "ES."

The foregoing connections and adaptations are presented merely as serving to illustrate a manner of interconnecting the circuits of the present invention and its compatibility with already existing and known telephone systems. Accordingly, the suggested adaptations are not to be understood as limiting in any way the application of the present invention to other telephone or information handling systems.

The service request detector D70 provides a pair of outputs connected to the collectors of the transistors T7 and T7', respectively, each of which collectors connect to the base of the other transistor through RC networks RC2 and RC2' respectively. The output from the collector of the transistor T7 is connected via the conductor L25 previously referred to, to the shuttle advance pulse generator P61 of Fig. 6. The output connected to the collector of the transistor T7' is connected via a conductor L26 to the diode D2 of the OR gate G21 controlling the operation of the advance pulse generator P20 of Fig. 2.

Thus far the organization of the advance pulse generator P20 and its driven circuits shift register SR10 and the counting circuit PC30 have been described. In addition the service request detector D70 and the circuits by means of which the latter exercises control over the advance pulse generator P20 and the shuttle advance pulse generator P61 have been considered. At this point the components actually accomplishing the scanning function will be described in detail. The alternate scanning of the group A and group B subscriber lines is ultimately controlled by a signal output generated when a complete cycle of operation of the counting circuit PC30 has been completed at which time the signal output is effective to transfer the scanning potential from the group just scanned to the other group. This control is accomplished however through a number of intermediary circuit elements. The signal indicating the completion of a counting cycle is applied via the conductor L22 from the output winding W19 of the core C8 of Fig. 5 to the base of a transistor T8 shown in Fig. 7, operated as a switch. The emitter of the transistor T8 is connected to a source of positive potential E9' and the collector is connected via a conductor L22' to the base of an emitter-follower transistor T10. The latter collector is also connected to the base of the transistor T9' which comprises one stage of a monopulser M71. The other stage of the monopulser M71 comprises the transistor T9. Both of the transistors T9 and T9' have their emitters connected to ground and their collectors connected to a positive potential source E10 through the resistors R26 and R26' respectively. The bases of each of the transistors T9 and T9' are connected to the collectors of the other transistor through capacitors CA8 and CA8'. In addition, the base of the transistor T9 is connected to the positive potential source E10 through a resistor R27, and the base of the transistor T9' is connected to a voltage divider comprising the resistors R28 and R28' connected between the collector of the transistor T9 and a negative potential source E11. The outputs of the monopulser M71 are taken from the emitter of the emitter-follower transistor T10 across a resistor R29 to ground, the collector of the transistor T10 being connected to a positive potential source E11'.

The reset circuit of the counting circuit PC30 extended via the conductor RSC is connected to the emitter of the emitter-follower of the transistor T10 and, in addition, the latter emitter-follower supplies a control signal to the OR gate G21 via a conductor L27 which signal in turn controls the pulse source P20. The monopulser M71 also is effective to supply a triggering signal to a binary counter BC76 via the conductor L28. The binary counter BC76 comprises substantially a flip-flop circuit similar in construction to that of the service request detector D70 and includes a pair of transistors T11 and T11', the emitters of which are connected to ground and the collectors of which are connected to a positive potential source E12 through the resistors R30 and R30'. The conductor L28 connects to the bases of both of the transistors T11 and T11' through a capacitor CA9 and diodes D7 and D7', respectively. The base of each of the transistors T11 and T11' is connected to collector of the other transistor through the RC networks RC4 and RC4', respectively and both of the bases are connected to a negative potential source E13 through the resistors R31 and R31', respectively. The outputs from the binary counter BC76 are taken from each of the bases of the transistors T11 and T11' to control the conduction of a pair of emitter-followers comprising the transistors T12 and T12'. The collectors of the transistors T12 and T12' are connected to the positive potential sources E14 and E14', respectively, and the emitters are connected to ground through the resistors R32 and R32'. The outputs from the emitters of the transistors T12 and T12' are applied to the respective inputs of a pair of monopulsers M74 and M75.

Since the two monopulsers M74 and M75 are identical in organization and operation only the monopulser M74 will be described in detail. The latter monopulser comprises a pair of transistors T13 and T13', the emitters of which are connected to ground and the collectors of which are connected to a positive potential source E15 through the resistors R33 and R33' respectively. The base of the transistor T13 is connected to the positive potential source E15 through the resistor R34 and to the collector of the transistor T13' through a capacitor CA10. The base of the transistor T13' is connected to the collector of the transistor T13 through a capacitor CA10'. In addition, the base of the transistor T13' is connected to a voltage divider comprising the resistors R35 and R35' connected between the collector of the transistor T9 and a negative potential source E16. An output is taken from the collector of the transistor T13′ through a capacitor CA11 and from the collector of the corresponding transistor of the monopulser M75 and applied to control switches SW72 and SW73 via the conductors L31 and L32, respectively. Since the latter switches are also identical in organization and operation only the switch SW72 will be described in detail herein. The switch SW72 comprises a transistor T14 having its emitter connected to ground and its base connected to the conductor L31 through a resistor R36, and to a negative potential source E17 through a resistor R37. The collectors of each of the transistors of the switches SW72 and SW73 are connected to the conductors L33 and L34, respectively which in turn are extended to the conductors L2 and L3, respectively, of the shift register SR10 of Fig. 1.

Returning to the binary counter BC76 and the emitter-followers T12 and T12′, in addition to the outputs connected to the inputs of the monopulsers M74 and M75 the outputs are also shown in Fig. 7 as connected to the conductors L35 and L36. The outputs of the emitter-followers T12 and T12′ are thus also extended via the conductors L35 and L36 to the terminals T6 of the terminal block TB60 of Fig. 6 where signals will be available on these terminals for line identification purposes. The combination of signals available for line identification purposes represented by the outputs from the hundreds section of the counting circuit PC30 and the outputs from the emitter-followers T12 and T12′ as available on the T6 terminals A and B will thus indicate in a biquinary form the particular A or B group and the hundreds subgroup of subscriber lines in which the line requesting service is found.

A circuit for the transfer of line condition information to the register SR10 may now be traced in connection with the representative A group subscriber subset TE1 as follows: from ground at the emitter of the transistor T14 of the switch SW72, the collector of the same transistor, conductor L33, scanning conductor L3, winding W1 of the core $C1_{189}$, conductor L1, and capacitor CA1 back to ground. The circuit just described provides a means for discharging the capacitor CA1 which is permitted to charge in a manner to be described. The transfer circuit associated with the other subsets, such as the representative subset of the B group of subscriber lines TE2, may be traced in a similar manner from ground at the switch SW73 and the conductor L34.

*Operation*

For purposes of describing a representative operation of the illustrative embodiment of this invention, the organization of which has been described, it will be assumed that the shift register SR10 has been cleared, that is, no subscriber line of either the A or the B group of lines has recently requested service and all of the components of the invention are in their normal operational states. The advance pulse generator P20 will accordingly be held in its deenergized condition and no advance current pulses are at the moment being supplied to the shift register SR10 or the counting circuit PC30. In addition, the counting circuit PC30 will be in its reset condition as a result of a previous counting operation. The restoration to the conditions of the components presently assumed will be described in detail hereinafter. A representative request for service appearing on the subscriber line having the directory number 189 of the A group of lines will be described which is the number designating the subset TE1 shown in the drawing. The switch SW72, shown in Fig. 7, controlling the scanning of the A group of lines will not yet be operative, that is, the transistor T14 of the switch SW72 will not yet have been rendered conductive to supply an input to the monopulser M74.

When the handset of the subscriber subset TE1 having the directory number 189A is removed from its cradle the conventional hook-switch, not shown, associated with the subset TE1 will be closed and a charging circuit for the capacitor CA1 will be completed as follows: from ground, capacitor CA1, resistor R9, line loop resistances R13 and the hook-switch contacts, resistor R14 to the negative potential source E1. The capacitor CA1 will tend to charge to the value of the potential source E1. When the switch SW72 controlling the scanning of the A group of lines is momentarily operated, that is, when the transistor T14 is momentarily rendered conductive in a manner to be described, a previously traced discharge circuit for the capacitor CA1 including the setting winding W1 of the core $C1_{189}$ of shift register SR10 will be completed. The capacitor CA1 will thereupon discharge, a negative current will flow in the setting winding W1 and the core $C1_{189}$ will be switched to its set condition of remanent magnetization. This set condition is understood for purposes of description herein in every case to be in the upward direction as viewed in Fig. 1 with respect to the symbols of the cores employed.

The particular circuit arrangement employed for accomplishing the setting of the cores of the shift register responsive to a request for service from a subscriber line is designed to extend the operating margin and thereby to assure greater protection against fortuitous operation. If the value of the resistor R9 is advantageously selected as greater than the sum of the values of resistors R13, the length of the subscriber loop circuit can have little effect on the scanning operation and momentary changes in the line loop condition will be negligible for all practical purposes. When the scan of the A group has been completed in a manner to be described hereinafter the information, that is, the set condition indicative of a request for service, stored in the register SR10 may be shifted out. This is accomplished by the alternate application of advance current pulses to the advance circuit conductors AC1 and AC2 supplied by the advance pulse generator P20 shown in Fig. 2. The operation of the latter generator is controlled by signals applied to the OR gate G21 such that when a positive signal is applied to either diode D2 or D3 the oscillator 25 is cut-off. The source and control of the signals applied to the diodes D2 and D3 will be discussed in detail; at this point it is to be understood that positive signals have been removed from both of the diodes D2 and D3 and the pulse generator P20 is free to begin its operation.

When the positive control signals are removed from the OR gate G21 thereby restoring the base of the transistor T6 to its normal bias from the source E7, the lesser negative bias supplied to the emitter from the source E7 will cause the transistor T6 to cut-off and thereby to trigger the operation of the oscillator 25. The latter oscillator includes the transistor T5 and its tank circuit comprising the inductance I5 and capacitance CA4. The values of the latter elements are advantageously selected to generate a frequency corresponding to the frequency of the advance pulses required for the operation of the shift register SR10 and the counting circuit PC30. An output from the oscillator 25 is taken by means of a secondary winding I4 the ends of which are each connected as previously described to the bases of the transistors T3 and T4 comprising the trigger stages 23 and 24 respectively. Thus, alternating voltages generated in the tank circuit of the oscillator 25 appear across the winding I4 and control the bias on the bases of the transistors T3 and T4. The latter elements are maintained cut-off by the positive potential sources E4 and E5 until a negative-going pulse is applied to a base. Such a negative pulse is applied across the capacitor CA2 from the oscillator 25 via the winding I4 to the base of the transistor T3 while the base of the transistor T4 is driven more positive by the same means. Transistor T3 will now conduct and a previously traced circuit is completed from ground at the emitter of the transistor T3 to the negative potential source E2 including the switching windings W5 of the cores C2 and C2'. The latter cores are initially in a set magnetic condition, that is, upward as viewed in Fig. 2, and the current flowing in this circuit from ground will begin to switch these cores to their reset magnetic conditions, that is, downward. As the cores C2 and C2' begin to switch a voltage will be induced across the trigger windings W8 of the switching cores, which voltages will effectively bias the bases of the transistors T1 and T1' negatively. As a result the latter transistors will now conduct and a regenerative current will flow in the circuits previously described from the positive potential source E3 including the switching windings W7 of the cores C2 and C2' and also including the setting windings W6 of the cores C3 and C3'. The current in the switching windings W7 and of the cores C2 and C2' will further drive the latter cores to their reset conditions and when applied via the setting windings W6 to the cores C3 and C3', will drive the latter cores to the set magnetic condition. The same currents, after accomplishing the setting function to prepare the pulsing circuit 22 for the succeeding alternation, is applied via the conductors L11 and L11' to the conductors A2 and A3. However, the advance currents, before being applied as described, accomplish a compensating function in connection with the compensating cores C4 and C4'. The latter cores are permanently maintained in a reset magnetic condition and, as a result, the positive advance current applied to the conductors A2 and A3, when passing through the windings W9 of the cores C4 and C4' tends to drive these cores further into magnetic saturation. When this occurs a small voltage will be induced across the windings W11 which will in turn be applied via the conductors L13 and L13' to the bases of the transistors T1 and T2 and T1' and T2' via the windings W8. This voltage will be of a polarity such as to oppose the triggering voltage developed across the trigger windings W8 by the switching of the cores C2 and C2', however the magnitude will be insufficient to materially effect the latter triggering function. In connection with the windings W8 of the cores C3 and C3', on the other hand, the voltage will be effective as to polarity and magnitude as applied to the bases of the transistors T2 and T2', to maintain these transistors cut-off during the switching of the cores C2 and C2'. Any interference with the setting of the cores C3 and C3' which might arise from undesired conduction of the trnasistors T2 and T2' is thus effectively forestalled.

By means of the operation of the advance pulse generator P20 just described a positive current pulse has been simultaneously applied to each of the conductors A2 and A3 and, via the former conductor, this current pulse appears in the advance circuit conductor AC2 serially connecting the advance windings W4 of the A group of cores C1 of the shift register SR10. Only the core $C1_{189}$ of the shift register will be affected by this advance current pulse since, it will be recalled, only this core was set by a request for service from its associated subscriber line number 189A. The advance current pulse will accordingly switch the core $C1_{189}$ to its reset magnetic condition as the result of the magnetomotive switching force developed across its advance winding W4. The switching of its magnetic condition induces an output voltage across the output winding W2 of the core $C1_{189}$ which causes a current in the loop CC5 coupling the core $C1_{189}$ with the next succeeding core, which in this case will be the core $C1_{688}$ associated with the subscriber line 688 of the B group of lines. This current will be of a direction such as to pass the diode D1 and will be effective, when applied to the input winding W3 oft he core $C1_{688}$ which is also included in the coupling loop CC5, to drive the core $C1_{688}$ to a set magnetic condition. By this single application of an advance current pulse to the advance circuit conductor AC2 the information, or set condition, parallelly introduced into the core $C1_{189}$ by a service request from its associated subscriber line, has been transferred to the next succeeding core $C1_{688}$ of the shift register SR10. When this transfer has been accomplished the trigger circuit 23 of the advance pulse generator P20 of Fig. 2 will be cut-off by the next alternation of the oscillator 25 and the trigger circuit 24 will be energized. Specifically, the base of the transistor T4 will be negatively biased and the transistor T4 will conduct. A previously traced circuit from ground at the emitter of the latter transistor and including the switching windings W5 of the cores C3 and C3' to the negative potential source E2 will be completed. The current in this latter circuit will switch the previously set cores C3 and C3' to their reset magnetic condition and, as a result of the regenerative action of the transistors T2 and T2' an output advance current pulse will appear on the conductors L10 and L10' after having performed its function of setting the cores C2 and C2' by means of the setting windings W6. The advance current pulse will now appear in the windings W10 of the compensating cores C4 and C4' where these cores and the voltages induced in the output windings will thereof perform the identical compensating function described above in connection with the setting of the cores C3 and C3'.

The second advance current pulse now appears simultaneously on each of the conductors A1 and A4. This second current pulse will now be applied via the advance circuit conductor AC1 to the advance windings W4 of the cores C1 associated with the B group of subscriber lines. Thus the second advance current pulse will be applied to the advance winding W4 of the core $C1_{688}$ to which core it will be recalled the set condition was transferred by the first advance current pulse. The core $C1_{688}$ will now be reset and the set magnetic condition will be transferred via a coupling loop CC5 to the next succeeding core, which will be the core $C1_{188}$, in the manner described above for the first transfer of information. With the completion of the transfer of information, or set condition, from the core $C1_{189}$ to the core $C1_{688}$ and then to the core $C1_{188}$, one complete cycle of operation of the oscillator 25 has been accomplished. Upon each further alternation of the oscillator 25 an advance current pulse will be generated and applied to one of the advance circuit conductors AC1 and AC2 and upon each cycle of operation of the oscillator 25 a set condition of the shift register SR10 will be advanced one two-core stage. It will be noted, in the consideration of the operation of the shift register SR10, that although an information shift is effected in a conventional shift register manner, the cores associated with one subscriber line group advantageously constitute the transfer cores for the cores associated with the other subscriber line group. The alternate application of advance current pulses to the advance circuit conductors AC1 and AC2 will be continued until the last core $C1_1$ is finally reset in which case a positive output signal will be induced in the output winding W2 and applied to the output circuit OC6 of the shift register SR10 across the resistor R7. To shift the set condition from the core $C1_{189}$ out of the register SR10 and thereby to produce a signal in the output circuit OC6 will have required 189 applications of an advance current pulse on each of the advance circuit conductors AC1 and AC2. The positive signal in the output circuit OC6 is applied by means of the conductor L23 to the input of the service request detector D70 shown in Fig. 7.

The service request detector D70 constitutes substantially a flip-flop circuit comprising the transistors T7 and T7' as previously described. The transistor T7 of the detector D70 is normally conducting and the transistor T7' is normally cut off. When the positive signal is applied via the conductor L23 to the base of the transistor T7' the latter will be rendered conductive and the transistor T7 will be cut off. The potential on the collector of the latter transistor will accordingly rise positively toward the value of the positive potential source E8 and, as a result, a positive going signal will appear on the conductor L26 connected to the diode D2 of the OR gate G21 of Fig. 2. The positive voltage thus impressed on the base of the normally cut-off transistor T6 via the diode D2 will cause the latter to conduct thus connecting the voltage divider connected to the negative potential source E7 to the base of the amplifier T5; the latter is thus cut off with a resulting interruption in the operation of the oscillator 25. The generation of advance current pulses is thus immediately interrupted and no further shifts of the register SR10 will occur until the oscillator 25 is again enabled by a removal of the positive signal from the base of the transistor T6.

When the generation of advance current pulses by the generator P20 wos originally initiated, it will be recalled that simultaneously with the application of the advance pulses to the conductors A2 and A1 duplicate pulses produced by the generator P20 were applied to the conductors A3 and A4 extending to the pulse counting circuit PC30 of Figs. 3, 4, and 5. At this point it will be convenient to return to the generation of the advance pulses applied to the advance circuit conductor AC2 of the shift register SR10 causing the set condition present in the core $C1_{189}$ to be transferred to the next succeeding core $C1_{688}$. Simultaneously with this advance current pulse an identically timed current pulse is applied via the conductor A3 to the advance circuit conductor AC3 serially connecting the advance windings W13 of the cores C5 of the units section of the counting circuit PC30 of Fig. 3. Initially the first cores of each section are in a set condition and the remaining cores of the counting circuit PC30 are in a reset condition. Accordingly, since the core $C5_0$ of the units section is set, it will be reset by the applied advance pulse. As a result of the switching of the magnetic condition of core $C5_0$ an output voltage will be induced across its output winding W14. In accordance with the switching principle of operation of M. Karnaugh referred to previously herein, the sense of the winding W14 will be such that the forward electromotive force induced will cause the advance current in the advance circuit conductor AC3 to be conducted, after passing the last advance winding W13 of the core $C5_9$, via the conductor AO1 and diode D4, through the output winding W14 of the switching core $C5_0$. The advance current will then return to ground along the conductor L13 and the input winding W15 of the core $C5'_0$ of the units section. The sense of the input winding W15 is such that the advance current will set the core $C5'_0$ as it passes to ground. The shift of a set condition in the counting circuit PC30 is thus seen to coincide with the shift of information in the shift register SR10 as a result of the simultaneous application of advance current pulses to the conductors A1 and A2, and A3 and A4, respectively. When the second advance current pulse is alternately applied on the conductor A4 and thereby on the advance circuit conductor AC4, the cores $C5'_0$ will be reset by the magnetomotive force developed in its advance winding W13. The advance current will again follow the circuit indicated by the forward electromotive force developed across the output winding W14 of the resetting core $C5'_0$ including the conductors AO2 and L13, and will be conducted to ground via the input winding W15 of the core $C5_1$. The latter core is accordingly set and, as was seen in the case of the operation of the shift register SR10, one application of the alternate advance current pulses has moved an element of information, a set magnetic condition, one stage, comprising the cores $C5_0$ and $C5'_0$ of the units section of the counting circuit PC30.

The stepping operation of the units section of the counting circuit just described is repeated with each alternate application of the advance current pulses to the conductors A3 and A4. As has also been described, in connection with the request for service from the subscriber 189A under consideration, 189 advance current pulses will be applied to each of the conductors A1, A2, A3, and A4 before the operation of the pulse generator P20 is interrupted by an output signal from the shift register SR10. The operation of the units section of the counting circuit PC30 is repeated in the manner described until the information, or set condition, is transferred to the last stage comprising the cores $C5_9$ and $C5'_9$. When the core $C5_9$ is reset by the tenth advance pulse appearing on the advance circuit conductor AC3 the information is transferred to the core $C5'_9$. However, now, instead of returning immediately to ground from the input winding W15 of the core $C5'_9$, the advance current pulse is conducted via the conductor A3 to the tens section of the counting circuit shown in Fig. 4, and specifically to the advance circuit conductor AC3 thereof. Since the first core of each of the counting sections is initially in a set condition, the core $C6_0$ will be reset and the advance curent will be conducted via its output winding W14 and a conductor L13 to the input winding W15 of the core $C6'_0$ and to ground. Core $C6'_0$ will be set and the next alternate advance current pulse is applied to the conductor A4 from the pulse generator P20. The latter pulse will be applied to the core $C5'_9$ of the units section via the advance circuit conductor AC4 and advance winding W13. The latter core will be reset and the advance current will be conducted through its output winding W14 and the conductor AC4' to the input winding W15 of the first core of the units section $C5_0$, which latter core will be set. The units section has in this manner by ten applications of an advance current pulse to each conductor A3 and A4 been stepped through a complete cycle of its operation and the core $C5_0$ is again set preparatory to the next cycle of operation.

The tenth advance pulse applied to the conductor A4, instead of returning immediately to ground, is conducted via the conductor A4 to the advance circuit conductor AC4 of the tens section of the counting circuit PC30 of Fig. 4. This current pulse, at the advance winding W13, resets the core $C6'_0$ and is further conducted via the output winding 14 of the core $C6'_0$ and conductor L13 to the input winding W15 of the core $C6_1$ which latter core is set as a result. The tenth pair of alternate advance current pulses has thus been effective to reset the units section and advance the tens section of the counting circuit PC30 one stage. The tenth advance current pulse on the conductor A4, it should be noted, has thus reset and set the cores $C5'_9$ and $C5_0$ of the units section and the cores $C6'_0$ and $C6_1$ of the tens section, respectively. The units section will continue to step through its cycle of operation upon the application of advance current pulses and upon each completion of a cycle the tens section will be advanced one stage, all in the manner described.

When the tens section of the counting circuit PC30 has been advanced to its last stage, which obviously will occur upon the application of the 99th advance current pulse to the conductors A3 and A4, the next pair of advance current pulses will transfer the set condition from the core $C6_9$ to the core $C6'_9$ and then from the core $C6'_9$ back to the first core $C6_0$ of the tens section. The latter recycling operation will be accomplished in the manner already described for the units section. The 100th pair of advance current pulses on the A3 and A4 conductors will be conducted, after setting the core $C6'_9$ and $C6_0$, via the conductors A3 and A4 to the hundreds section of Fig. 5. In that section the core $C7_0$, which it will be recalled was initially in a set magnetic condition, will be reset and the core $C7'_0$ will be set. The current pulse on the A4 conductor will then reset the core $C7'_0$ and set the core $C7_1$. The hundreds section has thus been advanced one stage upon the application of the 100th pair of advance current pulses to the conductors A3 and A4 from the pulse generator P20. Obviously, the 100th pair of advance current pulses has in addition to advancing the hundreds section, reset both the units and tens section preparatory to the application of further advance current pulses. The foregoing stepping operations of the counting circuit PC30 will continue until the operation of the pulse generator P20 is interrupted when an output pulse appears on the output circuit OC6 of the shift register SR10. As was previously explained, this will occur for the operation being described when 189 pairs of advance current pulses have been applied to the conductors A3 and A4. In accordance with the operation of the counting circuit PC30 already described responsive to the 189 pairs of advance current pulses, the units section will be halted at its ninth stage, that is, the core $C5_9$ will be set. The tens section will be halted with the core $C6_8$ set, and the hundreds section will have advanced to its one stage, that is, the core $C7_1$ will be set.

Returning now to the consideration of the service request detector D70 of Fig. 7, previously described, when a positive signal appears on the conductor L26 connected to the collector of the transistor T7, a negative signal appears on the conductor L25 connected to the collector of the now conducting transistor T7'. This negative signal is applied via the extended conductor L25 to another pulse generator P61 represented in block symbol form in Fig. 6. It is to be understood that the pulse generator P61 is identical in every respect to the pulse generator P20 of Fig. 2, previously described with the exception that only a single pulsing section, such as the section 22 is provided. Thus the conductor L25 is connected through a resistor, such as the resistor R22 of the generator P20, to the base of a control transistor corresponding to the transistor T6. Since the latter transistor is normally conducting, the pulse generator P61 is normally deenergized. Accordingly, when a negative pulse is applied to the base via the conductor L25, the control transistor will be cut off and the pulse generator P61 will be switched on in the manner described for the generator P20 of Fig. 2. Alternate shuttle advance current pulses will be produced on the conductors S3 and S4 by means of which conductors the shuttle advance pulses will be transmitted to the sections of the counting circuit PC30. The first of the shuttle advance pulses will be conducted via the conductor S3 to the units section of the counting circuit PC30. It will be recalled that the shuttle advance circuits including the advance and output windings W13 and W14 of the cores of the counting sections are arranged in a manner similar to that described for the advance circuits generally of the cores in accordance with the Karnaugh switching principle referred to hereinbefore. With the cores of the counting sections in the magnetic conditions described previously when the stepping operation was interrupted, the first shuttle advance current pulse will be conducted along the circuit extended via the conductor S3 and including: shuttle advance conductor SC3, advance and output windings W13' and W14' of core $C5_9$, conductor L13', input winding W15' of core $C5'_9$, conductor L14, and conductor S3'. This advance current pulse will further be conducted along the conductor SC3 of the tens section, advance and output windings W13' and W14' of core $C6_8$, conductor L13', input winding W15' of core $C6'_8$, conductor L13', conductor S3', conductor SC3 of the hundreds section, advance and output windings W13' and W14' of core $C7_1$, conductor L13', input winding W15' of core $C7'_1$, conductor L13', and conductor S3'. Finally the first shuttle advance current pulse will be conducted to ground through the winding W18 of the core C8 of Fig. 5. Observing the sense of the windings of the cores as represented by the mirror symbols, the first positive shuttle advance current pulse will, in completing the above circuit, reset and set the core $C5_9$ and $C5'_9$, cores $C6_8$ and $C6'_8$, and cores $C7_1$ and $C7'_1$, respectively, of the counting circuit PC30.

In connection with the second alternate shuttle advance current pulse applied to the conductor S4, it should be noted that the output circuit network configuration associated with the primed cores of the counting sections, instead of being connected to the input windings W15' of succeeding unprimed cores, are connected to the input windings W15' of the preceding unprimed cores. Thus when the second alternate shuttle pulse is applied, this time to the conductor S4, the primed cores of the sections previously set as above indicated, will be reset. Accordingly the set magnetic condition will be retransferred to the primed cores also noted above. With the successive application of the advance current pulses to the conductors S3 and S4, the set condition will be shuttled between the primed and unprimed cores, the former of which was left set by the interruption of the stepping operation of the counting circuit PC30. Thus, for example, the set condition of the core $C5_9$ of the units section will be shuttled between this core and the core $C5'_9$ as the shuttle advance current pulses are applied. This will similarly be the case between the cores $C6_8$ and $C6'_8$ of the tens section and the cores $C7_1$ and $C7'_1$ of the hundreds section.

When the core $C5_9$ is reset during the shuttle operation, a voltage will be induced across its shuttle winding W16 which causes a positive current in the conductor $L16_9$ extending to its terminal T6 shown in Fig. 6. Similarly when the core $C5'_9$ is reset during the same operation a voltage will also be induced across the shuttle winding W16 of the latter core. The latter winding W16 is wound in an opposite sense to that of the winding W16 of the core $C5_9$ with the result that the current in the conductor $L16_9$ is again positive. In each case the current across the resistor R24 to ground in the output network 62 in Fig. 6 presents a positive voltage at the terminal T6 of the conductor $L16_9$. In addition, when the cores $C5_9$ and $C5'_9$ are set during the shuttle operation, the voltage induced across the shuttle windings W16 will in each case cause a negative current in the conductor $L16_9$. The latter negative current will charge capacitor CA5 and a portion of this charge will be transferred to the capacitor CA6 by the next positive current in conductor $L16_9$. The charge on capacitor CA6 will maintain a positive potential on the terminal T6 of the conductor $L16_9$ during the entire shuttle operation in accordance with well-known voltage doubling action. In a similar manner and simultaneously with the shuttle operation of the cores $C5_9$ and $C5'_9$ of the units section, a shuttle operation is performed by the shuttle advance pulses on the cores $C6_8$ and $C6'_8$ of the tens section and the cores $C7_1$ and $C7'_1$ of the hundreds section. By means of the conductors $L18_8$ and $L20_1$ positive potentials will appear at the terminals T6 of the latter conductors through the respective output networks 62. The terminals T6 of the units conductor $L16_9$, the tens conductor $L18_8$, and the hundreds conductor $L20_1$ will in this manner be rendered "hot" for line identification purposes.

Returning at this point to the description of the binary counter BC76 of Fig. 7, it should be noted that the transistor T11 thereof is presently conducting in conformance with the assumption that the A group of subscriber lines has just been scanned. The outputs of the binary counter BC76 are transmitted from a pair of emitter-followers comprising the transistors T12 and T12'. During the conduction of the transistor T12 as controlled by the binary counter BC76, a positive potential is applied to the base of the transistor T13' of the monopulser M74. Also connected to the transistor T12 is a conductor L35 extending to an A terminal T6 of Fig. 6. The latter terminal is associated with the terminals T6 of the conductors L20 extending from the hundreds section of the counting circuit PC30 via the cable L21. The positive potential appearing at the base of the transistor T13' will accordingly also appear on the A terminal T6 of the conductor L35. Thus, in conjunction with the hundreds count of the counting circuit PC30 described, two signals are available in a biquinary mode, one signal on the conductor L35 indicative of the particular group in which the calling subscriber line appears, that is, whether in the 1 to 500 group or the 501 to 1000 group, and another signal on the conductor $L20_1$ indicative of the particular hundred subgroup within the group A or B in which the calling subscriber line is found, in this case, the first hundred subgroup.

The line identification potentials thus available on the terminals T6 of the line identification terminal block TB60 may advantageously be employed to control the operation of switching control circuits NG66 and switching network equipment SN65 shown in block symbol form in Fig. 6 which were described generally hereinbefore and with which the present invention may be adapted for use.

It will be recalled in connection with the description of the operation of the service request detector D70 of Fig. 7 that as the output signal from the shift register SR10 indicative of a request for service for the subscriber line 189A is applied to the base of the normally non-conducting transistor T7', the latter is caused to conduct and the transistor T7 is cut off. As a result a negative signal was applied via the conductor L25 to energize the pulse generator P61 of Fig. 6 and at the same time a positive signal was applied via the conductor L26 to the advance pulse generator P20 through the OR gate G21 to interrupt the operation of the latter generator. When the positive signal is applied on the conductor L24 and thereby to the base of the transistor T7 from the pulse source P63 at the time and in the manner previously described, the detector D70 is restored to its original operating condition, that is, with the transistor T7 conducting. At this point the normal potentials on the collectors of the transistors T7 and T7', and thereby on the conductors L25 and L26, respectively, will be restored. Accordingly, the disabling effect of the positive voltage on the conductor L26 having been removed, the advance pulse generator P20 will resume its operation. Also, the enabling effect of the negative voltage on the conductor L25 having been removed, the operation of the shuttle advance pulse generator P61 will be interrupted.

As was previously described in detail herein in connection with the operation of this invention, when the subscriber line 189A has requested service, the counting circuit PC30 was advanced to the condition where the cores $C5_9$, $C6_8$, and $C7_1$ were in a set condition whereupon the shuttle operation was initiated to provide the line identification potentials on the terminals T6 of Fig. 6. When the shuttle operation is terminated upon the deenergization of the pulse generator P61, the same cores will be left in the set magnetic condition. Since the switch SW72 controlling the scanning potential applied to the A group of lines is operated only momentarily and is opened before the pulse generator P20 can be reenergized, only those A group of lines on which service requests appear prior to the operation of the switch SW72 will be detected. In connection with the description of the operation of the line scanning circuit of this invention, although it was assumed that only the line 189A requested service, obviously other lines of the A group could as well have requested service either coincidentally with the request on the 189A line or prior or subsequent thereto before the application of the scanning potential. In any case it is further obvious that during any one scanning period the lowest numbered line, that is, the one associated with the cores nearest the end of the shift register SR10, will be effective first to interrupt the advance pulse generator P20 and have its position registered in the counting circuit PC30. For purposes of description, the line 189A was accordingly assumed to be such lowest numbered line. Any contemporaneous or subsequent call or calls for service from higher numbered lines in the A group will, during the A group scan, also set the associated cores in the shift register SR10.

When the operation of the advance pulse generator P20 is resumed upon the resetting of the service request detector D70 contemporaneous or subsequent calls on higher numbered lines in the A group will be registered in the counting circuit PC30 in their numerical order in precisely the same manner as described for the registering of the call on the subscriber line 189A. Each call in the form of a set condition of an associated line core, when it reaches the output circuit OC6 of the shift register SR10, will be effective to interrupt the advance pulse generator P20 and cause the line identification number to be read out of the counting circuit PC30 in the manner described above. Obviously, in the case of a lowered numbered subscriber line of the A group requesting service subsequent to the call on the line 189A but before the A group scan and before the set condition introduced by the latter call has reached the output circuit OC6, precedence is given to the lower numbered subscriber line.

Assuming the subscriber line 189A to be the highest numbered line upon which a request for service appeared during the application of the scanning potential by the switch SW72, the subsequent operation of the counting circuit PC30 will now be described. Upon the resumption of the operation of the advance pulse generator P20 and the alternate application of advance current pulses to the conductors A1 and A2, and A3 and A4, the stepping operation of the counting circuit PC30 is continued from the point at which the registration of the service request of the subscriber line 189A was identified. When the stepping operation as previously described has advanced to the core $C7_4$ of the hundreds section of the counting circuit PC30 the advance current pulse appearing on the conductor A3 will be applied via the advance circuit conductor AC3 to the advance winding W13 of the core $C7_4$ and the latter core will be reset. The advance current pulse will accordingly be conducted via the conductor L13 to the input winding W15 of the last core $C7'_4$ of the hundreds section and of the counting circuit PC30. The latter core will be set and the advance current pulse will thereupon pass to ground. Finally, the following advance current pulse appearing on the conductor A4 will be applied to the advance winding W13 of the core $C7'_4$ via the advance circuit conductor AC4. The latter core will be reset and the advance current pulse will be conducted via the conductors L13 and AC4' to the input winding W15 of the first core $C7_0$ of the hundreds section, which core will accordingly again be set. The last advance current pulse on the conductor has in this manner reset each of the sections of the counting circuit PC30 when each section has been completely advanced through its count. Each section has thus been left with its initial core in a set condition and each of its remaining cores in a reset condition.

After setting the core $C7_0$ the last advance current pulse is conducted from the input winding W15 via the conductor A4 and the winding W17 of the core C8 to ground. The latter core, it will be recalled, was set by the first shuttle advance pulse applied via the conductor S3 from the shuttle advance pulse generator P61 of Fig. 6. The sense of the winding W17 is such that the advance current pulse resets the core C8 thereby inducing a negative current pulse in the conductor L22 through the output winding W19 to the positive potential source E8'. This negative current pulse is transmitted via the conductor L22 to the base of the transistor T8 associated with the monopulser M71 of Fig. 7. The collector of the latter transistor is connected to the base of the normally non-conducting transistor T9′ of the monopulser M71. Conduction of the monopulser M71 is as a result transferred to the transistor T9′. Base current at this time drives the base of the transistor T10 of the succeeding emitter-follower more positive and the latter transistor also conducts with the result that a positive end-of-count output signal is produced at the emitter of the transistor T10. This positive signal is employed to accomplish a number of functions. It is applied to the conductor RSC extending to the counting circuit PC30 by means of which it is serially conducted to the reset windings W12 of all of the cores of the latter circuit. The sense of the reset windings W12 with respect to each of the cores to which the windings are inductively coupled is such as to insure that the counting circuit PC30 has been cleared, that is, has the first cores $C5_0$, $C6_0$, and $C7_0$ of each of its sections in a set condition and the remaining cores in a reset condition, when the counting circuit PC30 has been advanced completely through its counting cycle.

The positive signal from the emitter of the transistor T10 is also applied via the conductor L27, extending to Fig. 2, to the base of the control transistor T6 of the pulse generator P20 through the diode D3 of the OR gate G21. The operation of the advance pulse generator P20 is interrupted at this time in the manner described previously herein in connection with the application of a positive signal to the OR gate 21 from the service request detector D70. Two operating conditions thus serve to interrupt the operation of the advance pulse generator P20: a positive signal produced by the service request detector D70 upon a request for service and a positive signal produced by the monopulser M71 upon the completion of a counting cycle of the counting circuit PC30. The latter interruption insures that only the subscriber lines requesting service prior to a single group scan have been identified by the counting circuit PC30. The latter interruption also provides an interval during which the line condition information of lines to be scanned next may be transferred to the register SR10.

Finally, the end-of-count positive signal is applied via the conductor L28 to reset the binary counter BC76. It was assumed, in accordance with a scan of the A group of subscriber lines, that the counter BC76 was in the state in which the transistor T11 was conducting. With the application of the positive signal on the conductor L28 and thereby to the base of the transistor T11′, the latter transistor will conduct and the transistor T11 will be cut off. Accordingly, the transistor T12′ having its base connected to the base of the transistor T11′ and acting as a switch, will be rendered operative. The transistor T12 switch will be turned off and at this time the monopulser M75 will be caused to pass through one of its operative cycles in the manner described earlier for the operation of the monopulser M74. A negative pulse will now be conducted via the conductor L32 to the base of the transistor T14′ comprising the switch SW73. The latter switch will be rendered operative during the time that the monopulser M75 is in its unstable state. This time will be the period during which the transfer of line condition information from the B group of lines is accomplished. The operation of the present invention will follow for the requests for service in the B group of subscriber lines in a manner identical to that described for requests for service in the A group of lines. Thus, for example, the description could be repeated in connection with a request for service on the subset TE2 designated as number 810B. In this connection the core $C1_{810}$ would be set and this information would be shifted out of the register SR10 by the successive application of advance pulses at the same time that the advance pulses were counted by the counting circuit PC30.

*Control pulse relationship.*

Figure 9:
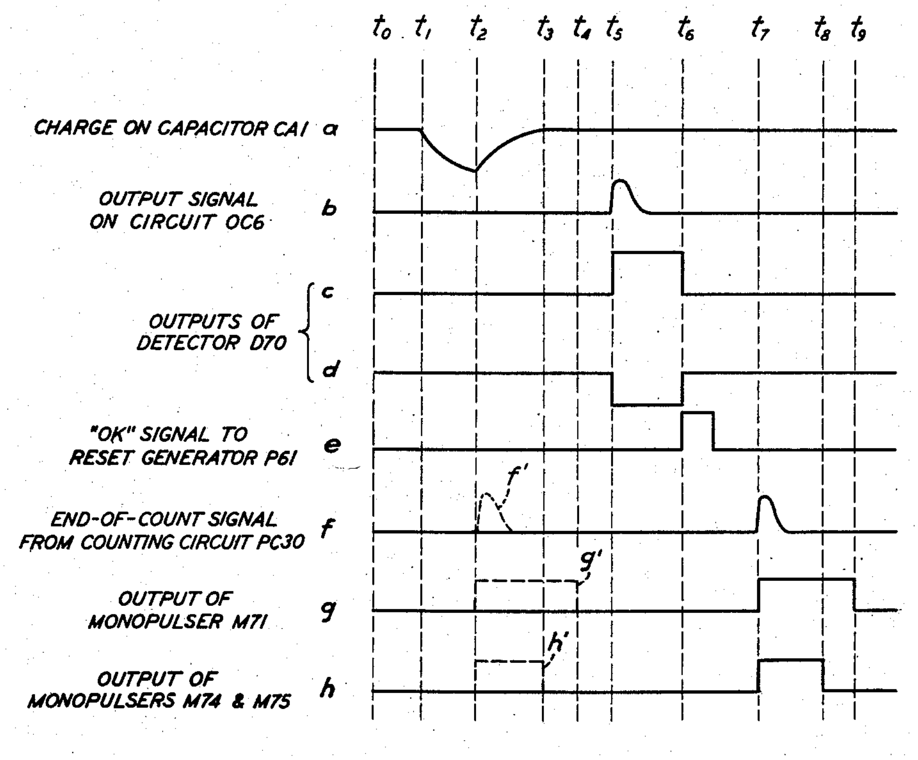
Fig. 9 shows a graphical comparison of the control pulses applied at various stages of this invention and the time relationship thereof.

In recapitulation of the operation of this invention in connection with a representative request for service on the subscriber line 189A as described above, reference may be had to Fig. 9. In this figure is shown the time relationship of the control pulses applied at various circuit components of this invention to control the operation thereof, the pulses themselves being shown in an idealized form. At time $t_1$ the handset of the subset TE1 is removed from its cradle and the hookswitch is closed, the period $t_1$ to $t_2$ representing the charging time of the capacitor CA1, the charge of which is represented as $a$. During the period $t_2$ to $t_3$ an enabling pulse $h'$ is applied from the monopulser M74 to operate the switch SW72 and permit the capacitor CA1 to discharge through the associated setting winding W1 of the shift register SR10. During the period $t_2$ to $t_4$ the advance pulse generator P20 is prevented from operating by the positive pulse $g'$ applied from the monopulser M71. Thus the advance pulse generator P20 does not initiate the shifting out of the shift register SR10 of any information stored therein until an appreciable time after the scan has been completed. The period $t_4$ to $t_5$ depends entirely upon the relative position within the shift register SR10 that the information, or the request for service on line 189A, is contained, that is, upon the length of time required to shift the information out of the register. Accordingly, at the time $t_5$ an output signal $b$ appears on the output circuit OC6 which controls the service request detector D70 to produce two output pulses $c$ and $d$; the positive signal $c$ interrupting the advance pulse generator P20 and the negative signal $d$ energizing the shuttle advance pulse generator P61. The duration of the period $t_5$ to $t_6$ will be governed by the length of time necessary to perform the line identification and switching control functions by external equipment and may be set by selecting suitable circuit values. At the time $t_6$ the signal $e$, corresponding to the "OK" signal of the Patent No. 2,723,311 previously referred to, is supplied by the pulse source P63 to reset the service request detector D70 to permit the resumption of the operation of the advance pulse generator P20 and to interrupt the shuttle advance pulse generator P61. The end-of-count signal $f$ is produced by the pulse counting circuit PC30 at the time $t_7$, the period $t_6$ to $t_7$ being determined by the number of additional requests for service shifted from the shift register SR10 and the operations resulting therefrom. From the time $t_7$ to $t_9$ the signal $g$ is produced by the monopulser M71 which signal is applied to insure the resetting of the counting circuit PC30, the interruption of the advance pulse generator P20, and the advance of the binary counter BC76. At virtually the same time $t_7$ the monopulser M75 operates responsive to the signal $g$ to produce the signal $h$ which is operative to enable the switch SW73 thereupon accomplishing the next succeeding scan, in the case of the representative operation of the invention described, this being the scanning of the B group of subscriber lines. Obviously, the period of a single scanning cycle is represented by the interval between the end-of-count signals shown as $f'$ and $f$ and is measured from the time $t_2$ to $t_7$.

The employment of the present invention in a manner such that dial pulses generated by a calling subscriber may be detected is readily accomplished. Thus, in a single complete scanning cycle, each line on which a request for service is encountered is identified to associated utilization circuits in the manner hereinbefore described. This request for service appears in actuality as the conventional "off-hook" condition of the line which is undistinguishable at any instant from the closed line condition during a dial pulse. In each single complete scanning cycle, that is, the period from one operation of the monopulser M71 to the next operation, the associated utilization circuits have also been informed as to which lines were in an "on-hook" or open condition, namely, those lines at which the advance of the counting circuit PC30 was not interrupted. With the foregoing information available any point in the operative cycle of this invention, successive "on-hook" and "off-hook" sequences may be recognized and counted as dial pulses by the expedient of employing suitable well-known memory means assigned to each line on which an initial or first "off-hook" condition has been detected.

What has been described is considered to be an illustrative embodiment of the principles of the present invention and it is to be understood that numerous other arrangements may also be devised by one skilled in the art without departing from the spirit and scope of this invention.

What is claimed is:

1. In a signaling system, a plurality of magnetic cores having a first and a second condition of remanent magnetization, a plurality of coupling means each including an output winding and an input winding inductively coupled to adjacent ones of said cores for coupling said cores in sequence, advance circuit means including an advance winding inductively coupled to each of said cores, an output circuit connected to the output winding of the last core in said sequence, a signaling means having a first and a second electrical condition, means responsive to said first electrical condition for setting one of said cores to said first condition of remanent magnetization, an advance current source for applying periodic core switching currents to said advance circuit means, means for counting said periodic switching currents, and means responsive to signals in said output circuit for controlling said advance current source.

2. In a signaling system, a plurality of magnetic cores, each of said cores being capable of switching from a first to a second condition of remanent magnetization, a plurality of coupling means each including an output winding and an input winding inductively coupled to succeeding ones of said cores for coupling said cores in a particular sequence, advance circuit means including an advance winding inductively coupled to each of said cores, an output circuit connected to the output winding of the last core in said sequence, a plurality of signaling lines associated respectively with said plurality of cores, each of said lines having a first and a second electrical condition, setting means responsive to said first electrical condition of said signaling lines for setting the associated cores of said plurality of cores to said first condition of remanent magnetization, an advance current source for applying periodic switching currents to said advance circuit means, means for counting said periodic switching currents, and means responsive to a signal in said output circuit for interrupting said advance current source.

3. In a signaling system, the combination according to claim 2, in which said setting means comprises setting windings inductively coupled to said associated cores and a potential source controlled by the electrical condition of the said one of said signaling lines.

4. In a signaling system, the combination according to claim 2, in which said setting means comprises a setting winding inductively coupled to each of said associated cores, a capacitor charged responsive to said first electrical condition of said signaling lines, and means for discharging said capacitor through the setting windings of the associated cores of said plurality of cores.

5. In a signaling system, a first and a second plurality of magnetic cores, each of said cores being capable of switching from a first to a second condition of remanent magnetization, means for inductively coupling the cores of said pluralities of cores in an alternating sequence, an output circuit inductively coupled to the last core in said sequence, a first and a second group of signaling lines inductively coupled to the cores of said first and said second plurality of magnetic cores respectively, each of said lines having a first and a second electrical condition, setting means responsive to said first electrical condition in one of said signaling lines for setting an inductively coupled core to said first condition of remanent magnetization, advance circuit means including an advance current source for applying periodic switching currents to said cores, means for counting said periodic switching currents, and means responsive to a signal in said output circuit for interrupting said advance current source.

6. In a signaling system, a magnetic core shift register means including a setting winding inductively coupled to each core, output circuit means, and advance circuit means including an advance pulse generator; a plurality of signaling circuits, each including a capacitor, a source of potential, and a switching means for connecting said capacitor to said source of potential; a discharge circuit for each of said capacitors, each including one of said setting windings, means for periodically connecting said discharge circuits to said capacitors, means responsive to a signal in said output circuit for interrupting said advance pulse generator, means for counting successive shifts of said register, and means for subsequently energizing said advance pulse generator.

7. An electrical circuit comprising a first and a second plurality of magnetic cores, each of said cores being capable of switching from one to another condition of remanent magnetization, a plurality of coupling means for inductively coupling each core of each of said pluralities of cores to a succeeding core of the other of said pluralities of cores, means for setting a particular one of said cores in said one condition of remanent magnetization, an advance circuit means including an advance current generator inductively coupled to each of said cores for applying alternate core switching currents to said first and said second plurality of cores, means responsive to said switching currents for counting said alternate switching currents, an output circuit inductively coupled to one of said cores, means responsive to a signal in said output circuit for interrupting said advance current generator, and means operative after a predetermined interval for energizing said advance current generator.

8. An electical scanning circuit comprising a plurality of groups of magnetic cores, each of said cores being capable of switching from one to another condition of remanent magnetization, means for inductively coupling the cores of each of said groups of cores to next succeeding cores in another of said groups of cores, a plurality of groups of signaling circuits associated respectively with said plurality of groups of magnetic cores, each of said signaling circuits including a first switching means, a plurality of second switching means associated respectively with said plurality of groups of signaling circuits, means for sequentially operating said plurality of second switching means, means including a current source responsive to the combined operation of the first switching means of a particular signaling circuit of one of said groups of signaling circuits and the associated second switching means for causing a current in said particular signaling circuit, means responsive to said current for setting the associated core in said one condition of remanent magnetization, advance circuit means including an advance current generator for sequentially applying switching currents to said groups of magnetic cores, means responsive to said switching currents for counting said sequential application of said switching currents, an output circuit means inductively coupled to the last core of said plurality of groups of cores, means responsive to a signal in said output circuit for interrupting said advance current generator, and means for subsequently energizing said advance current generator.

9. In a signaling system, a magnetic core shift register, a plurality of signaling lines, means for setting particular cores of said register in accordance with signals on said lines, advance circuit means for said register, a pulse generator for applying advance pulses to said advance circuit means, an output circuit for said register, means for counting said advance pulses, means responsive to a signal in said output circuit for interrupting said pulse generator, and means for subsequently energizing said pulse generator.

10. A telephone system comprising a plurality of groups of magnetic cores, each of said cores being capable of switching from a first to a second condition of remanent magnetization, an input, an output, an advance, and a setting winding inductively coupled to each of said cores, a plurality of coupling means for connecting respectively the output windings of the cores of each of said groups of cores and input windings of the cores of a successive one of said groups of cores, a plurality of groups of subscriber circuits, each of said subscriber circuits including respectively a first switching means and one of said setting windings; a plurality of second switching means, a setting current source, means responsive to the combined operation of one of said first switching means and one of said plurality of second switching means for applying a setting current to the setting winding of a particular core of one of said groups of cores to set said particular core in said first condition of remanent magnetization, a plurality of advance circuit means including an advance current generator for applying switching currents to the advance windings of the cores of successive groups of cores, an output circuit connected to the output winding of a last core of said groups of cores, counting means responsive to the operation of said advance current generator for counting the switching currents applied to the advance windings of the cores of said groups of cores, means responsive to a signal in said output circuit for interrupting said advance current generator, means responsive to the completion of the operation of said counting means for generating an end-of-count signal, means responsive to said end-of-count signal for sequentially controlling the operation of said plurality of second switching means, and means for subsequently energizing said advance current generator.

11. A telephone system comprising a shift register means comprising a plurality of stages, each of said stages having two electrically discernable states, a plurality of subscriber lines associated respectively with said plurality of stages, means responsive to a calling condition on one of said subscriber lines for setting the associated one of said stages to one of said states, advance means for shifting the said one of said states along said register means, an output circuit for said register means, counting means for counting successive shifts of said register means, means responsive to a signal in said output circuit for interrupting said advance means, and means for subsequently energizing said advance means.

12. A telephone system comprising a magnetic core shift register comprising alternating groups of magnetic cores, coupling means for inductively coupling successive cores of said register, advance circuit means for each of said groups of cores, a setting winding inductively coupled to each core of said groups of cores, advance current generator means for sequentially applying periodic advance currents to said advance circuit means, and an output circuit inductively coupled to the last core of said register; a plurality of groups of subscriber lines connected respectively to the setting windings of the cores of each of said groups of cores, testing means for sequentially connecting a testing potential to said plurality of groups of subscriber lines and said setting windings to set an inductively coupled core responsive to a calling condition in one of said lines, counting means for counting said periodic advance currents applied to said advance circuits, means responsive to a signal in said output circuit for interrupting said advance current generator, means responsive to the termination of the operation of said counting means for generating an end-of-count signal, and means responsive to said end-of-count signal for controlling said testing means.

13. A telephone system according to claim 12 also comprising means responsive to said end-of-count signal for clearing said counting means.

14. A telephone system comprising a magnetic core shift register comprising a first and a second group of magnetic cores arranged in an alternating sequence, coupling means for inductively coupling successive cores of said register, advance circuit means for each of said groups of cores, a setting winding inductively coupled to each of said first and second group of cores, advance current generator means for alternately applying periodic advance currents to said advance circuit means, and an output circuit inductively coupled to the last core of said register; a first and a second group of subscriber circuits associated respectively with said first and second group of magnetic cores, each of said subscriber circuits including one of said setting windings, testing means for alternately connecting a potential to the subscriber circuits of each of said groups of circuits to set a particular one of said cores responsive to a calling condition in the associated subscriber circuit, counting means for counting the periodic advance currents applied to said advance circuit means, means responsive to a signal in said output circuit for interrupting said advance current generator, means responsive to the termination of the operation of said counting means for generating an end-of-count signal, and means responsive to said end-of-count signal for controlling said testing means.

15. In a telephone system, a line scanning arrangement comprising a two-core-per-bit magnetic core shift register, a setting winding inductively coupled to each core of said register, a first and a second group of subscriber lines connected respectively to the setting windings of the alternating cores of said register, a source of potential, a first and a second switching means for alternately connecting said source of potential simultaneously to the setting windings of the alternating cores of said register to place a particular core of said register in a set condition responsive to a calling condition in a particular one of said lines, an advance current source for alternately applying periodic advance currents to said register to shift said set condition out of said register, and counting means for counting the periodic advance currents necessary to shift said set condition out of said reigster.

16. In a telephone system, a line scanning arrangement according to claim 15, also comprising means responsive to the completion of said counting operation for generating an end-of-count signal, and means responsive to said end-of-count signal for alternately controlling said first and said second switching means, the particular switching means operated determining the particular group of said particular one of said lines and the said counting operation determining the particular one of said lines.

17. In a telephone system, a line scanning arrangement according to claim 16, also comprising means responsive to the shift of said set condition out of said register for interrupting said advance current source, means responsive to said end-of-count signal for clearing said counting means, and means for subsequently energizing said advance current source.

18. An electrical scanning circuit comprising a two-core-per-bit magnetic core shift register, a setting winding inductively coupled to each core of said register, a first and a second group of subscriber line circuits connected respectively to the setting windings of the alternating cores of said register, a first and a second scanning circuit connected to the setting windings of the alternating cores of said register respectively, a first and a second switching means operative to apply a scanning potential to said first and said second scanning circuits respectively, means responsive to a calling condition on said subscriber line circuits of one of said groups of line circuits and the application of said scanning potential to the associated scanning circuit for setting particular cores of said register, first advance circuit means including a first advance current generator for applying periodic advance currents to the cores of said register, an output circuit inductively coupled to the last core of said register, counting means for counting said periodic advance currents, and control means operated responsive to a signal in said output circuit for interrupting said first advance current generator.

19. An electrical scanning circuit as claimed in claim 18, in which said counting means comprises a magnetic core sequential switch comprising a first and a second plurality of magnetic cores arranged in an alternating sequence, and second advance circuit means also including said first advance current generator for sequentially setting the cores of said first and said second plurality of cores in accordance with said application of advance currents to the cores of said register.

20. An electrical scanning circuit as claimed in claim 19, also comprising means for subsequently reenergizing said first advance current generator.

21. An electrical scanning circuit as claimed in claim 19, also comprising means for generating an end-of-count signal responsive to the completion of a counting cycle of said counting means, means responsive to said end-of-count signal for also interrupting said first advance current generator, and means also responsive to said end-of-count signal for controlling the operation of said first and said second switching means.

22. An electrical scanning circuit as claimed in claim 19, also comprising means for determining set cores of said sequential switch comprising coupling circuit means for coupling the cores of said first and second plurality of magnetic cores in pairs, third advance circuit means including a second advance current generator for shuttling a set magnetic condition between the cores of said pairs of cores, means also operated responsive to said signal in said output circuit for energizing said second advance current generator, and means responsive to currents in said coupling circuits for producing identifying potentials corresponding to the subscriber line circuits having said calling condition.

23. An electrical scanning circuit as claimed in claim 22, also comprising means responsive to the operation of said first and said second switching means for producing an identifying potential corresponding to the said one group of said first and said second group of subscriber line circuits.

24. An electrical scanning circuit comprising a magnetic core shift register comprising a first and a second plurality of magnetic cores, said cores being arranged in an alternating sequence, circuit means for coupling each of said cores to a succeeding core in said sequence a setting winding inductively coupled to each core of said register, a first group of subscriber line circuits connected to the setting windings of said first plurality of magnetic cores, respectively, a second group of subscriber line circuits connected to the setting windings of said second plurality of magnetic cores, respectively, a first and a second scanning circuit connected to the setting windings of the alternating cores of said register, a first and a second switching means operative to apply a potential to said first and said second scanning circuits to alternately scan said first and said second group of subscriber line circuits, the cores of each of said pluralities of cores constituting storage cores for the connected subscriber line circuits of one group of said line circuits during a scan of said one group and transfer cores for the connected subscriber line circuits of said one group of said line circuits during a scan of the other group, and means responsive to a calling condition on said subscriber line circuits of one of said groups of line circuits and the application of said potential to the associated scanning circuit for setting particular cores of said register.

25. An electrical scanning circuit as claimed in claim 24, also comprising an advance circuit means including and advance current generator for applying periodic advance currents to the cores of said register, an output circuit inductively coupled to the last core of said register, counting means for counting said periodic advance currents, and control means operated responsive to a signal in said output circuit for interrupting said advance current generator.

References Cited in the file of this patent

UNITED STATES PATENTS

| | | |
|---|---|---|
| 2,730,695 | Ziffer | Jan. 10, 1956 |
| 2,736,880 | Forrester | Feb. 28, 1956 |
| 2,753,400 | Vincent | July 3, 1956 |
| 2,776,380 | Andrews | Jan. 1, 1957 |